United States Patent
Tanaka et al.

(10) Patent No.: US 7,972,581 B1
(45) Date of Patent: Jul. 5, 2011

(54) METHOD OF TREATING NITROGEN OXIDE-CONTAINING GAS

(75) Inventors: Osamu Tanaka, Matsuyama (JP); Yukihiro Tokunaga, Matsuyama (JP); Yusuke Okamoto, Matsuyama (JP); Kenji Yasui, Matsuyama (JP)

(73) Assignee: Miura Co., Ltd., Matsuyama-shi, Ehime-ken (JP)

( * ) Notice: Subject to any disclaimer, the term of this patent is extended or adjusted under 35 U.S.C. 154(b) by 0 days.

(21) Appl. No.: 12/158,166

(22) PCT Filed: Apr. 13, 2007

(86) PCT No.: PCT/JP2007/058143
§ 371 (c)(1),
(2), (4) Date: Mar. 17, 2009

(87) PCT Pub. No.: WO2008/004369
PCT Pub. Date: Jan. 10, 2008

(30) Foreign Application Priority Data

Jul. 4, 2006 (JP) .................................. 2006-184879
Jul. 4, 2006 (JP) ..................... PCT/JP2006/313329
Jul. 31, 2006 (JP) .................................. 2006-208520

(51) Int. Cl.
*B01D 53/56* (2006.01)
(52) U.S. Cl. .................................................... 423/239.1
(58) Field of Classification Search ........................ None
See application file for complete search history.

(56) References Cited

U.S. PATENT DOCUMENTS

| 5,353,748 A | 10/1994 | Kayahara et al. |
| 6,425,754 B1 * | 7/2002 | Lindskog .......................... 431/5 |
| 6,792,895 B2 | 9/2004 | Kayahara et al. |

FOREIGN PATENT DOCUMENTS

| EP | 0-208-434 A1 | 1/1987 |
| JP | 61-291026 A | 12/1986 |
| JP | 05-038421 A | 2/1993 |
| JP | 06-065708 U | 9/1994 |
| JP | 07-133905 A | 5/1995 |
| JP | 3221582 B2 | 8/2001 |
| JP | 2001-241619 A | 9/2001 |
| JP | 2003-275543 A | 9/2003 |
| JP | 2004-069139 A | 3/2004 |
| JP | 2004-077085 A | 3/2004 |
| JP | 2004-125378 A | 4/2004 |
| WO | 99/20375 A1 | 4/1999 |

OTHER PUBLICATIONS

International Search Report of PCT/JP2007/058143, date of mailing Jul. 17, 2007.

* cited by examiner

*Primary Examiner* — Melvin C Mayes
*Assistant Examiner* — Stefanie Cohen
(74) *Attorney, Agent, or Firm* — Westerman, Hattori, Daniels & Adrian, LLP

(57) ABSTRACT

First, the emission amount of nitrogen oxides can be decreased close to zero as much as possible, and the emission amount of carbon monoxide is decreased to a permissible range. Second, energy saving by combustion at a low air ratio close to 1.0 is realized. Third, air ratio control is performed stably in a combustion region at a low air ratio.

The present invention includes: a combustion step of burning hydrocarbon-containing fuel in the burner, thereby generating gas free of hydrocarbons but containing oxygen, nitrogen oxides, and carbon monoxide; a hazardous-substance decreasing step of bringing the gas into contact with an oxidation catalyst, thereby oxidizing carbon monoxide contained in the gas by oxygen and reducing nitrogen oxides by carbon monoxide; and a concentration ratio adjusting step of adjusting a concentration ratio of oxygen, nitrogen oxides, and carbon monoxide in gas on a primary side of the oxidation catalyst to a predetermined concentration ratio in which a concentration of nitrogen oxides on a secondary side of the oxidation catalyst is decreased to substantially zero or a value equal to or lower than a predetermined value and a concentration of carbon monoxide on the secondary side of the oxidation catalyst is also decreased to substantially zero or a value equal to or lower than a predetermined value.

11 Claims, 14 Drawing Sheets

FIG. 10

| Concentration Ratio | Adjustment | | NOx Concentration (ppm) | CO Concentration (ppm) | O₂ Concentration (ppm) |
|---|---|---|---|---|---|
| 0.91 | Adjustment 1 | Before Pass-Through | 88 | 3114 | 1380 |
|  |  | After Pass-Through | 0.4 | 103.0 | «100 |
| 1.01 | Adjustment 0 | Before Pass-Through | 89 | 2949 | 1450 |
|  |  | After Pass-Through | 1.0 | 66.0 | «100 |
| 1.44 | Adjustment 0 | Before Pass-Through | 89 | 2461 | 1730 |
|  |  | After Pass-Through | 0.0 | 18.0 | «100 |
| 1.63 | Adjustment 0 | Before Pass-Through | 89 | 2914 | 1920 |
|  |  | After Pass-Through | 0.0 | 9.0 | «100 |
| 1.84 | Adjustment 0 | Before Pass-Through | 89 | 2250 | 2030 |
|  |  | After Pass-Through | 0.8 | 11.0 | «100 |
| 2.18 | Adjustment 2 | Before Pass-Through | 88 | 2069 | 2210 |
|  |  | After Pass-Through | 26.1 | 1.0 | «100 |
| 2.55 | Adjustment 2 | Before Pass-Through | 88 | 1922 | 2410 |
|  |  | After Pass-Through | 57.2 | 1.1 | 510 |
| 5.11 |  | Before Pass-Through | 87 | 1360 | 3430 |
|  |  | After Pass-Through | 78.9 | 0.0 | 2220 |

METHOD OF TREATING NITROGEN OXIDE-CONTAINING GAS

TECHNICAL FIELD

The present invention relates to a method of treating nitrogen oxide-containing gas employed in a water-tube boiler and a regenerator of an absorption refrigerator.

BACKGROUND ART OF THE INVENTION

Generally known principles of suppressing NOx emissions include the suppression of flame (combustion gas) temperatures and a decrease in retention time of combustion gas at high-temperatures. As such, various technologies are available for decreasing the emission of nitrogen oxides by applying these principles. Various methods have been proposed and put into practical use, for example, two-stage combustion, lean-rich combustion, exhaust gas recirculate combustion, water mixing combustion, steam injection combustion, and flame cooling combustion by a water tube group.

Moreover, NOx sources relatively small in capacity such as water-tube boilers are also beginning to be required for a further decrease in emission of NOx due to an increasing awareness of environmental problems. In this case, the decrease in NOx generation inevitably entails an increased amount of emitted CO, thus making it difficult to attain a simultaneous decrease in NOx and CO.

A cause of the above problem is that a simultaneous decrease in emission of NOx and CO is technically incompatible. More specifically, when temperatures of combustion gas are abruptly lowered and kept at temperatures of 900° C. or less in an attempt to decrease the emission of NOx to result in an ample generation of CO, the thus generated CO is emitted before oxidization to increase the amount of emitted CO. In other words, temperatures of combustion gas are kept higher in an attempt to decrease the amount of emitted CO, thus resulting in an insufficient suppression of NOx generation.

In order to solve the above problem, the applicant has proposed low NOx and low CO emission technologies for decreasing as much as possible the amount of CO, which is generated in accordance with a decrease in the amount of NOx generation, and also suppressing temperatures of combustion gas so as to attain oxidation of the thus generated CO. The technologies are now commercially feasible (refer to Patent Documents 1 and 2). However, an actual value of emitted NOx remains to be about 25 ppm in the low NOx emission technologies described in Patent Documents 1 and 2.

In order to solve the above problem, the applicant has proposed a low NOx combustion method in which a NOx decreasing step is conducted to suppress temperatures of combustion gas so as to give priority to suppression of NOx generation rather, than a decrease in the amount of emitted CO, thereby keeping the value of the thus generated NOx to a predetermined value or lower, and a CO decreasing step is, thereafter, conducted so as to keep the value of CO emitted from the NOx decreasing step to a predetermined value or lower (refer to Patent Documents 3 and 4). The technologies disclosed in Patent Documents 3 and 4 are able to decrease the amount of emitted NOx to a value lower than 10 ppm, but find it difficult to decrease the amount of emitted NOx to a value below 5 ppm. This is due to the fact that combustion characteristics inevitably entail NOx generation at 5 ppm or greater.

Then, in the low NOx emission technologies disclosed in Patent Documents 3 and 4, as shown in FIG. 15, combustion is affected at a high air-ratio combustion region Z1 where the air ratio is 1.38 or greater. In contrast, at a combustion region Z2 where the air ratio is 1.1 or lower (hereinafter, referred to as "low air ratio"), nitrogen oxides are generated in an increased amount, thus making it difficult to attain a simultaneous decrease in the amount of emitted NOx and CO. There is also posed a difficulty in controlling a stable combustion due to a possible occurrence of backfire where the air ratio is 1 or lower. Therefore, the low air-ratio combustion region Z2 has hardly been subjected to research and development. In FIG. 15, the lines F and E graphically show NOx characteristics and CO characteristics on a primary side of a combustion apparatus of the present invention, and the lines U and J graphically show NOx characteristics and CO characteristics of the combustion apparatus of the present invention. Both of the low NOx emission technologies on a secondary side disclosed in Patent Documents 3 and 4 are in principle those in which a burner is used to conduct combustion at the high air ratio region Z1, thereby suppressing the generation of NOx and removing the thus generated CO through an oxidation catalyst (Patent Documents 3 and 4).

On the other hand, there is a growing demand for operating boilers at a low air ratio not only to attain a greater decrease in emitted NOx but also to save energy.

The inventors of the present application have been engaged in research and development of a combustion method of decreasing the amount of emitted nitrogen oxides to zero as much as possible by use of an oxidation catalyst.

Moreover, the method disclosed in Patent Document 5 is known as that of treating nitrogen oxide-containing gas generated on combustion by a burner.

According to the method of treating exhaust gas in Patent Document 5, a burner is used to conduct combustion at an air ratio lower than 1.0, whereby oxygen is not contained in combustion exhaust gas but unburned components such as CO and HC (hydrocarbons) are contained, and a nitrogen oxide reducing catalyst is used to reduce nitrogen oxides by unburned components, thereby purifying the nitrogen oxides. Then, air is supplied to exhaust gas after purification, thereby purifying the unburned components by using an oxidation catalyst.

The treatment method of Patent Document 5 is not a method of decreasing carbon monoxide and nitrogen oxides in the presence of oxygen. Further, according to the method described in Patent Document 5, unburned hydrocarbons are emitted in a great amount, thus making it difficult to decrease the concentrations of emitted nitrogen oxides and emitted carbon monoxide to substantially zero by using an oxidation catalyst. Further, an oxidation catalyst having characteristics in which the reduction efficiency of nitrogen oxides decreases in the presence of hydrocarbon cannot be used. Still further, in a step of reducing nitrogen oxides, a catalyst is used, which is different from that used in a step of oxidizing unburned components, resulting in a complicated treatment.

Further, a method of purifying nitrogen oxide-containing gas emitted from a gas engine is known in Patent Document 6. Patent Document 6 describes that nitrogen oxides and carbon monoxide are purified by using a three-way catalyst, which essentially requires the presence of hydrocarbons in gas and is applicable only to gas at a theoretical air ratio in which no excess oxygen is present. Therefore, the treatment method of Patent Document 6 is not suitable in treating combustion gas resulting from a combustion apparatus such as a boiler, which occurs on combustion by a burner and contains excess oxygen.

Still further, a technology in which an oxidation catalyst is used to reduce nitrogen oxides contained in exhaust gas derived from an incinerator by carbon monoxide is known in Patent Document 7. According to the technology of Patent Document 7, since nitrogen oxides is not reduced in the presence of oxygen in exhaust gas, fuel is burned at an excessively high concentration (air ratio of less than 1) on primary combustion, by which exhaust gas is kept deprived of oxygen. The technology in Patent Document 7 is subjected to such restriction that fuel is burned at an excessively high concentration, thus making it difficult to find an application for the combustion apparatus such as a burner-equipped boiler in which oxygen is contained in exhaust gas.

[Patent Document 1] Japanese Patent No. 3221582
[Patent Document 2] U.S. Pat. No. 5,353,748
[Patent Document 3] Japanese unexamined Patent Application, First Publication No. 2004-125378
[Patent Document 4] U.S. Pat. No. 6,792,895
[Patent Document 5] Japanese unexamined Patent Application, First Publication No. 2001-241619
[Patent Document 6] Japanese unexamined Patent Application, First Patent Document 5-38421
[Patent Document 7] Japanese unexamined Patent Application, First Publication No. 2003-275543

DISCLOSURE OF THE INVENTION

Problem to be Solved by the Invention

A problem to be solved by the present invention is to provide a method of treating nitrogen oxide-containing gas, which is capable of decreasing the amount of emitted nitrogen oxides and carbon monoxide contained in oxygen-containing gas to a value close to zero as much as possible or in a permissible range, using an oxidation catalyst, by a simple method.

Means for Solving the Problem

The inventors of the present application have conducted research for solving the above problem, finding a point at which the amount of emitted nitrogen oxides and carbon monoxide is decreased to substantially zero in a burner combustion region at a low air ratio as close to 1 as possible (the region Z2 in FIG. 15), for which research has been so far hardly conducted for a boiler equipped with an oxidation catalyst to decrease carbon monoxide as described in Patent Documents 3 and 4. As a result, they have studied causes for which the amount of emitted nitrogen oxides and carbon monoxide can be decreased to substantially zero, thus obtaining a new finding that a concentration ratio of oxygen, nitrogen oxides, and carbon monoxide on the primary side of the oxidation catalyst is given as a predetermined reference concentration ratio, thereby an oxidation catalyst is used to decrease the amount of emitted nitrogen oxides and carbon monoxide as close to zero as possible. At the same time, the concentration ratio is adjusted in the vicinity of the predetermined reference concentration ratio, thereby obtaining a new finding that the amount of emitted hazardous substances (nitrogen oxides and carbon monoxide) can be decreased to substantially zero or a permissible value. The present invention has been completed on the basis of these findings. According to the present invention, it is possible not only to decrease the concentration of emitted hazardous substances to substantially zero but also to attain a remarkable energy savings due to the fact that the above decrease can be obtained at an air ratio as close to 1.0 as possible.

Hereinafter, a simple reference of concentration ratio means a concentration ratio of oxygen, nitrogen oxides, and carbon monoxide on the primary side of the oxidation catalyst. The oxidation catalyst may include any known oxidation catalyst or a new oxidation catalyst.

In other words, the inventors of the present application have broken through technical common sense that oxygen is a barrier for reduction of nitrogen oxides by carbon monoxide on the basis of actions of an oxidation catalyst, as described in Patent Document 7 and used new technological approaches for utilizing oxygen to adjust a concentration relationship between oxygen, nitrogen oxides, and carbon monoxide on the primary side of the oxidation catalyst to a predetermined relationship (a predetermined concentration ratio), thus finding a solution for the above problem.

The above problem includes the following auxiliary problems. A first auxiliary problem is that hydrocarbons, which will inhibit the decrease in hazardous substances (NOx and CO) of the oxidation catalyst, are not contained in gas generated by a burner. This problem can be solved without use of the hydrocarbon removing device by conducting combustion at which no abrupt cooling is conducted like an internal combustion engine.

A second auxiliary problem is how to give a concentration ratio of the above gas as the predetermined reference concentration ratio. Mere combustion by the burner does not yield the predetermined reference concentration. This auxiliary problem can be solved by the adjustment using the concentration ratio characteristics of the burner, the adjustment using the concentration ratio characteristics of endothermic device for absorbing heat from the burner and the gas therefrom, or the auxiliary adjustment of the concentration ratio by auxiliary adjusting device in addition to the above adjustments.

As described above, the present invention is an epoch-making invention, which is not only remarkable in hazardous-substance decreasing effects but also able to easily solve the above problem by the technical means for adjusting the concentration ratio using conventional burners and an oxidation catalysts.

The present invention is not limited to boilers but may be applicable to a method of treating nitrogen oxide-containing gas generated by a burner.

The invention as described in Claim 1 relates to a method of treating nitrogen oxide-containing gas by bringing gas generated on combustion of fuel in a burner into contact with an oxidation catalyst, to thereby decrease nitrogen oxides contained in the gas, including: a combustion step of burning hydrocarbon-containing fuel in the burner, thereby generating gas free of hydrocarbons but containing oxygen, nitrogen oxides, and carbon monoxide; a hazardous-substance decreasing step of bringing the gas into contact with an oxidation catalyst, thereby oxidizing carbon monoxide contained in the gas by oxygen and reducing nitrogen oxides by carbon monoxide; and a concentration ratio adjusting step of adjusting a concentration ratio of oxygen, nitrogen oxides, and carbon monoxide in gas on a primary side of the oxidation catalyst to a predetermined concentration ratio in which a concentration of nitrogen oxides on a secondary side of the oxidation catalyst is decreased to substantially zero or a value equal to or lower than a predetermined value and a concentration of carbon monoxide on the secondary side of the oxidation catalyst is also decreased to substantially zero or a value equal to or lower than a predetermined value.

In this instance, the concentration of nitrogen oxides decreased to substantially zero is preferably 5 ppm, more preferably 3 ppm and still more preferably zero. The concentration of carbon monoxide decreased to substantially zero is preferably 30 ppm and more preferably 10 ppm. Further, in the following description, the concentration of oxygen decreased to substantially zero is 100 ppm or lower and preferably below a measurement limit value. Still further, the concentration of nitrogen oxides and that of carbon monoxide equal to or lower than a predetermined value mean a value below the standard for concentrations of emissions stipulated in various territories and countries. However, as a matter of course, it is preferable to set the value to substantially zero. As described above, in the meaning of the standard for concentrations of emissions, a value below "predetermined value" may be referred to as "permissible value" or "emission standard value."

According to the invention as described in Claim 1, a concentration ratio of the gas is given as the above predetermined concentration ratio, using the above oxidation catalyst, in the above adjusting step, whereby, in the hazardous-substance decreasing step, the concentration of carbon monoxide is adjusted using the oxidation function of carbon monoxide by oxygen effectively, and the concentration of nitrogen oxides on the secondary side of the oxidation catalyst can be decreased to be substantially zero or a value equal to or lower than a predetermined value, and the concentration of carbon monoxide on the secondary side of the oxidation catalyst can be decreased to be substantially zero or a value equal to or lower than a predetermined value. Further, in combustion in the above combustion step, hydrocarbon is not emitted to the gas. Therefore, compared with the method of conducting combustion so that hydrocarbon is emitted as in Patent Document 7, combustion control can be performed easily. Further, gas flowing into the above oxidation catalyst does not contain hydrocarbon, so that the decrease in nitrogen oxides and carbon monoxide by the above oxidation catalyst can be performed effectively without using the complicated procedure as in Patent Document 5, and the adjustment of the concentration ratio can be performed easily without taking the reaction with hydrocarbon into consideration.

The invention as described in Claim 2 relates to a method of treating nitrogen oxide-containing gas by bringing gas generated on combustion of fuel in a burner into contact with an oxidation catalyst, to thereby decrease nitrogen oxides contained in the gas, including: a combustion step of burning hydrocarbon-containing fuel in the burner, thereby generating gas free of hydrocarbons but containing oxygen, nitrogen oxides, and carbon monoxide; a hazardous-substance decreasing step of bringing the gas into contact with an oxidation catalyst, thereby oxidizing carbon monoxide contained in the gas by oxygen and reducing nitrogen oxides by carbon monoxide; and a concentration ratio adjusting step of adjusting a concentration ratio K of oxygen, nitrogen oxides, and carbon monoxide in gas on a primary side of the oxidation catalyst, in which the concentration ratio adjusting step is one of the following adjustment 0, adjustment 1, and adjustment 2.

Adjustment 0: the concentration ratio K is adjusted to a predetermined reference concentration ratio $K0$ in which a concentration of nitrogen oxides and a concentration of carbon monoxide on a secondary side of the oxidation catalyst are decreased to substantially zero.

Adjustment 1: the concentration ratio K is adjusted to a first predetermined concentration ratio $K1$ in which the concentration of nitrogen oxides on the secondary side of the oxidation catalyst is decreased to substantially zero and the concentration of carbon monoxide on the secondary side of the oxidation catalyst is decreased to a predetermined value or lower.

Adjustment 2: the concentration ratio K is adjusted to a second predetermined concentration ratio $K2$ in which the concentration of carbon monoxide on the secondary side of the oxidation catalyst is decreased to substantially zero and the concentration of nitrogen oxides on the secondary side of the oxidation catalyst is decreased to a predetermined value or lower.

The invention as described in Claim 3 includes, in Claim 2, a formula for determining the predetermined reference concentration ratio $K0$ is given as the following formula (1), the predetermined reference concentration ratio $K0$ satisfies the following formula (2), and the first predetermined concentration ratio $K1$ is made smaller than the predetermined reference concentration $K0$ ratio and the second predetermined concentration ratio $K2$ is made larger than the predetermined reference concentration ratio $K0$.

$$([NOx]+2[O_2])/[CO]=K \quad (1)$$

$$1.0 \leq K=K0 \leq 2.0 \quad (2)$$

where [CO], [NOx], and [$O_2$] represent the concentrations of carbon monoxide, nitrogen oxides, and oxygen, respectively, satisfying a condition of [$O_2$]>0.

According to the invention as described in Claim 2 or Claim 3, in the concentration ratio adjusting step, the above Adjustment 0, that is, the concentration ratio K of the gas, is given as the predetermined reference concentration ratio $K0$. Thereby the oxidation catalyst can be used to decrease the concentration of emitted nitrogen oxides and that of emitted carbon monoxide to substantially zero. Further, the Adjustment 1, that is, the concentration ratio K of the gas, is given as the first predetermined concentration ratio $K1$. Thereby the oxidation catalyst can be used to decrease the concentration of emitted nitrogen oxides to substantially zero and that of emitted carbon monoxide to a value equal to or lower than a predetermined value. Still further, the Adjustment 2, that is, the concentration ratio of the gas is given as the second predetermined concentration ratio $K2$. Thereby the oxidation catalyst can be used to decrease the concentration of emitted carbon monoxide to substantially zero and that of emitted nitrogen oxides to a value equal to or lower than a predetermined value. In addition, other effects described in Claim 1 can also be realized similarly in Claim 2 or 3.

The invention as described in Claim 4 relates to a method of treating nitrogen oxide-containing gas by bringing gas generated on combustion of fuel in a burner into contact with an oxidation catalyst, to thereby decrease nitrogen oxides contained in the gas, including: a combustion step of burning hydrocarbon-containing fuel in the burner, thereby generating gas free of hydrocarbons but containing oxygen, nitrogen oxides, and carbon monoxide; a hazardous-substance decreasing step of bringing the gas into contact with an oxidation catalyst, thereby oxidizing carbon monoxide contained in the gas by oxygen and reducing nitrogen oxides by carbon monoxide; and a concentration ratio adjusting step of adjusting a concentration ratio K of oxygen, nitrogen oxides, and carbon monoxide in gas on a primary side of the oxidation catalyst to a predetermined concentration ratio, in which the predetermined concentration ratio satisfies the following formula (3).

$$([NOx]+2[O_2])/[CO] \leq 2.0 \quad (3)$$

where [CO], [NOx], and [$O_2$] represent concentrations of CO, NOx, and $O_2$, respectively, and satisfying a condition of [$O_2$]>0.

According to the invention as described in Claim 4, a concentration ratio of the gas is given as the predetermined concentration ratio in the above concentration ratio adjusting step, whereby, in the hazardous-substance decreasing step, the concentration of carbon monoxide is adjusted using the oxidation function of carbon monoxide by oxygen effectively, the concentration of emitted nitrogen oxides is decreased to be substantially zero using the oxidation catalyst, and the concentration of emitted carbon monoxide can be decreased to substantially zero or a value equal to or lower than a predetermined value. The other effects described in Claim 1 can be realized similarly in Claim 4.

The invention as described in Claim 5 includes, in any one of Claims 1 to 4, an air ratio of the burner of 1.1 or lower.

According to the invention as described in Claim 5, in addition to the effects of the inventions as described in any one of Claims 1 to 4, the effect capable of realizing energy saving can be exhibited.

The invention as described in Claim 6 includes, in any one of Claims 1 to 4, the adjustment of the concentration ratio K being performed using concentration ratio characteristics of the burner.

According to the invention as described in Claim 6, the concentration ratio adjustment is performed by using the concentration ratio characteristics of the burner, so the effect of not requiring the means for adjusting a concentration ratio separately can be realized in addition to the effect of the invention as described in any one of Claims 1 to 4.

The invention as described in Claim 7 includes, in any one of Claims 1 to 4, the adjustment of the concentration ratio K being performed by using concentration ratio characteristics between the burner and endothermic device for absorbing heat from the gas placed between the burner and the oxidation catalyst.

According to the invention as described in Claim 7, in addition to the effect of the invention as described in any one of Claims 1 to 4, the concentration ratio adjustment is performed by using the concentration ratio characteristics of the burner and the endothermic device, so the means for adjusting a concentration ratio is not required separately. Further, the effects that the temperature of the gas can be suppressed by the endothermic device, and the durability of the oxidation catalyst can be enhanced are realized.

The invention as described in Claim 8 includes, in any one of Claims 1 to 4, the adjustment of the concentration ratio K is performed by using concentration ratio characteristics of the burner and by using auxiliary adjusting device for supplementarily adjusting the concentration ratio placed between the burner and the oxidation catalyst.

According to the invention as described in Claim 8, the concentration ratio adjustment is performed by using the auxiliary adjusting device in addition to the concentration ratio characteristics of the burner, so the effect capable of enlarging the range of the burner and the endothermic device to which the present invention is applicable can be realized in addition to the effect of the invention as described in any one of Claims 1 to 4.

The invention as described in Claim 9 includes, in any one of Claims 1 to 4, the adjustment of the concentration ratio K is performed by using concentration ratio characteristics between the burner and endothermic device for absorbing heat from the gas placed between the burner and the oxidation catalyst, and by using auxiliary adjusting means for supplementarily adjusting the concentration ratio K placed between the burner and the oxidation catalyst.

According to the invention as described in Claim 9, the concentration ratio adjustment is conducted using the auxiliary adjusting device in addition to the concentration ratio characteristics of the burner and the endothermic device, so the effect capable of enlarging the range of the burner and the endothermic device to which the invention is applicable can be realized in addition to the effect of the invention as described in any one of Claims 1 to 4.

The invention as described in Claim 10 includes a method of treating nitrogen oxide-containing gas by bringing gas generated on combustion in a burner containing nitrogen oxide and carbon monoxide into contact with an oxidation catalyst, to thereby decrease concentrations of emitted nitrogen oxides and emitted carbon monoxide, including: making the gas include oxygen; and adjusting a concentration ratio among nitrogen oxide, carbon monoxide, and oxygen on a primary side of the oxidation catalyst in the gas to a predetermined concentration ratio to thereby decrease concentrations of the nitrogen oxides and the carbon monoxide to substantially zero or a value equal to or lower than a predetermined value.

According to the invention as described in Claim 10, the concentration ratios of nitrogen oxides, carbon monoxide, and oxygen is adjusted by the presence of oxygen. Therefore, the predetermined concentration ratio can be adjusted easily, and the emission concentrations of the nitrogen oxides and carbon monoxide can be easily decreased to be substantially zero or a value equal to or lower than a predetermined value, using the oxidation catalyst.

Further, the invention as described in Claim 11 includes, in Claim 10, an air ratio set by the air-ratio adjusting device of 1.1 or lower.

According to the invention as described in Claim 12, in addition to the effects of the inventions as described in Claim 11, the effect capable of realizing energy saving can be exhibited.

Effects of the Invention

According to the present invention, the emission amounts of nitrogen oxides and carbon monoxide can be easily decreased to a value close to zero as much as possible, or can be easily decreased to a predetermined value or less in a permissible range.

BRIEF DESCRIPTION OF THE DRAWINGS

FIG. 10A drawing for explaining the NOx and CO decreasing characteristics in Embodiment 1.

DESCRIPTION OF THE REFERENCE SYMBOLS

Figure 1:
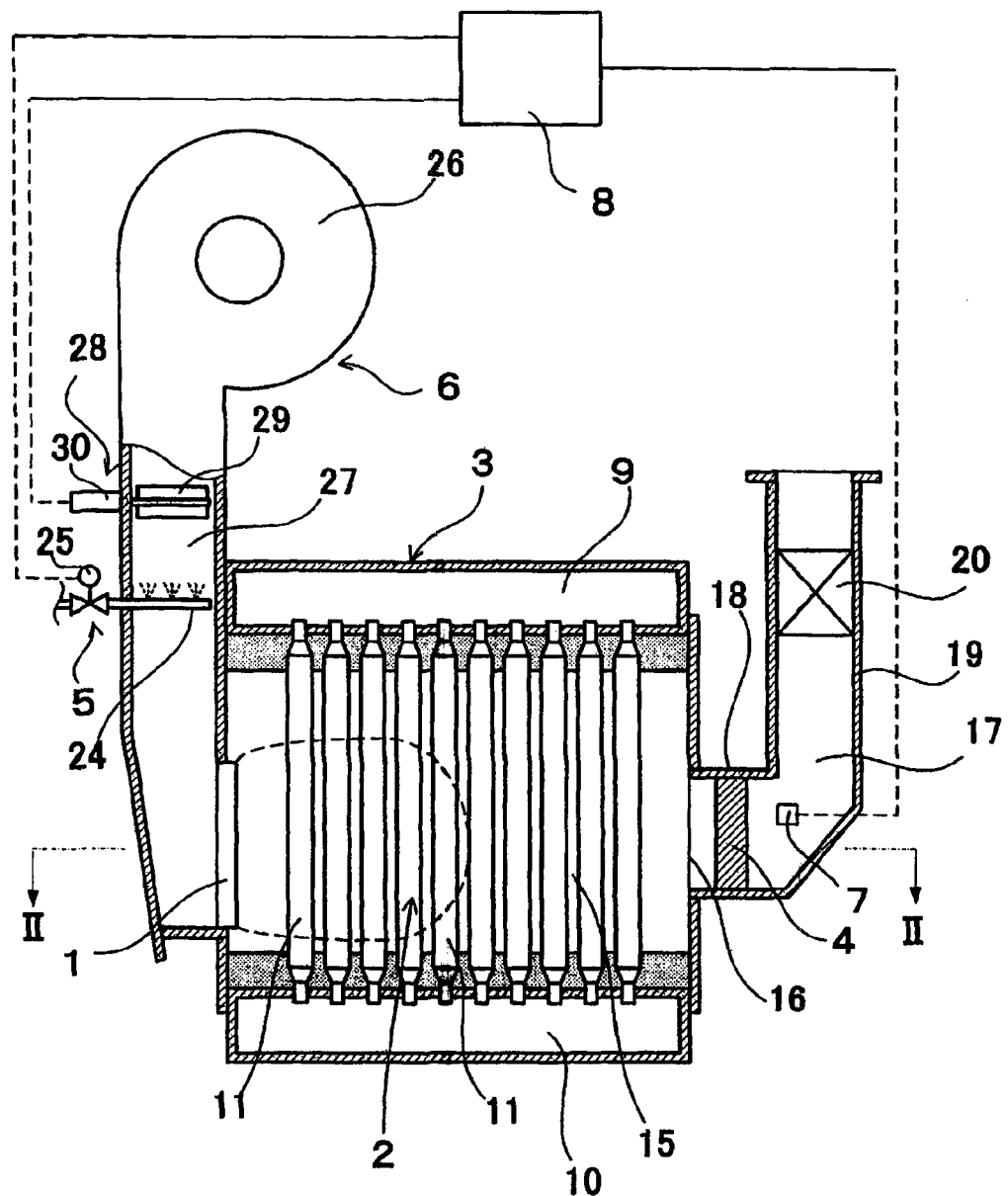
FIG. 1A longitudinal sectional view for explaining a steam boiler of Embodiment 1.

1: burner
4: oxidation catalyst
7: sensor
8: controller
28: air-ratio adjusting device
29: damper
30: damper position adjusting device
34: motor

BEST MODE FOR CARRYING OUT THE INVENTION

Next, an explanation will be given for embodiments of the present invention. An explanation will be made for terms used in the present application before the embodiments of the present invention will be explained. "Gas" includes gas, which has completely passed from a burner through an oxidation catalyst (also referred to as an oxidation/reduction catalyst and hereinafter simply referred to as "catalyst"), and gas, which has passed through the catalyst, is referred to as "exhaust gas." Therefore, the gas includes that in which burning reactions are in progress (combustion process) and that in which the burning reactions are completed, and is also referred to as combustion gas. In this instance, where the catalyst is installed in multiple stages along the gas flow, the "gas" is defined as gas covering that which has completely passed through the catalyst at a final stage, and "exhaust gas" is defined as gas after passing through the catalyst at the final stage.

"A primary side of the catalyst" is a side where a burner is installed with respect to a catalyst, referring to immediately before the passage of gas through the catalyst unless otherwise specified, whereas "a secondary side of the catalyst" is a side opposite to the primary side of the catalyst.

Further, "free of hydrocarbons" does not mean that hydrocarbons will not be generated at all in a process of burning reactions, but means that hydrocarbons are generated to some extent during the process of burning reactions but hydrocarbons, which reduce nitrogen oxides are not substantially contained (lower than a measurement limit) in gas flowing into the catalyst at a stage where the burning reactions are completed.

Still further, an air ratio m is defined as $m=21/(21-[O_2])$ However, $[O_2]$ represents the concentration of oxygen in exhaust gas on the secondary side of the catalyst, but $[O_2]$ used in determining an air ratio represents the concentration of excess oxygen in an oxygen excess region and also represents as a negative value the concentration of insufficient oxygen necessary for burning unburned gas such as carbon monoxide at the air ratio $m=1$ in a fuel excess region.

Next, an explanation will be made for embodiments of the present invention. The present invention is applicable to a water-tube boiler such as a small through-flow boiler, a hot-water supply system, and a combustion apparatus (also referred to as a thermal component or a combustion device) used in a regenerator for an absorption refrigerator.

Embodiment 1

A combustion apparatus such as boilers to which the embodiment of the method of treating nitrogen oxide-containing gas according to the present invention is applicable is typically provided with, as main parts, a burner, a storage water heater body including a group of heat transfer tubes (water tubes) as endothermic device for absorbing heat from gas generated by the burner, an oxidation catalyst in which gas containing oxygen, nitrogen oxides, and carbon monoxide at predetermined concentration ratios after passing through the group of heat transfer tubes passes in contact, thereby oxidizing carbon monoxide and also reducing nitrogen oxides, fuel supply device for supplying fuel gas to the burner, combustible air supply device for supplying combustible air to the burner and for premixing the combustible air and fuel, a sensor for detecting the concentration of oxygen on the downstream of the oxidation catalyst, and a controller for inputting signals from the sensor or the like to control the fuel supply device and the combustible air supply device.

Embodiment 1 of the present invention, which is favorably applicable to the above-described combustion apparatus, is a method of treating nitrogen oxide-containing gas for allowing gas generated on combustion of fuel in a burner to be in contact with an oxidation catalyst, to thereby decrease nitrogen oxides contained in the gas. The method of treating nitrogen oxide-containing gas includes a combustion step in which hydrocarbon-containing fuel is burned in the burner to generate gas free of hydrocarbons but containing oxygen, nitrogen oxides, and carbon monoxide, a hazardous-substance decreasing step in which the gas is brought into contact with an oxidation catalyst, oxidizing carbon monoxide contained in the gas by oxygen and reducing nitrogen oxides by carbon monoxide, and a concentration ratio adjusting step in which a concentration ratio of oxygen, nitrogen oxides, and carbon monoxide in gas on the primary side of the oxidation catalyst is adjusted to a predetermined concentration ratio in which the concentration of nitrogen oxides on the secondary side of the oxidation catalyst is decreased to substantially zero or a value equal to or lower than a predetermined value and the concentration of carbon monoxide on the secondary side of the oxidation catalyst is decreased to substantially zero or a value equal to or lower than a predetermined value.

Embodiment 2

Embodiment 1 of the present invention can be described by the following Embodiment 2. Embodiment 2 of the present invention provides a method of treating nitrogen oxide-containing gas by bringing gas generated on combustion of fuel in a burner into contact with an oxidation catalyst, to thereby decrease nitrogen oxides contained in the gas, including: a combustion step of burning hydrocarbon-containing fuel in the burner, thereby generating gas free of hydrocarbons but containing oxygen, nitrogen oxides, and carbon monoxide; a hazardous-substance decreasing step of bringing the gas into contact with an oxidation catalyst, thereby oxidizing carbon monoxide contained in the gas by oxygen and reducing nitrogen oxides by carbon monoxide; and a concentration ratio adjusting step of adjusting a concentration ratio K of oxygen, nitrogen oxides, and carbon monoxide in gas on a primary side of the oxidation catalyst, in which the concentration ratio adjusting step is one of the following adjustment 0, adjustment 1, and adjustment 2.

Adjustment 0: the concentration ratio K is adjusted to a predetermined reference concentration ratio K0 in which a concentration of nitrogen oxides and a concentration of carbon monoxide on the secondary side of the oxidation catalyst are decreased to substantially zero.

Adjustment 1: the concentration ratio K is adjusted to a first predetermined concentration ratio K1 in which the concentration of nitrogen oxides on the secondary side of the oxidation catalyst is decreased to substantially zero and the concentration of carbon monoxide on the secondary side of the oxidation catalyst is decreased to a predetermined value or lower.

Adjustment 2: the concentration ratio K is adjusted to a second predetermined concentration ratio K2 in which the concentration of carbon monoxide on the secondary side of the oxidation catalyst is decreased to substantially zero and the concentration of nitrogen oxides on the secondary side of the oxidation catalyst is decreased to a predetermined value or lower.

Then, the catalyst is characterized in that it decreases each of the concentration of nitrogen oxides and that of carbon monoxide on the secondary side of the catalyst to substantially zero when the Adjustment 0 is made, decreasing the concentration of nitrogen oxides and that of carbon monoxide on the secondary side of the catalyst to substantially zero and a value equal to or lower than a predetermined value, respectively, when the Adjustment 1 is made, and decreasing the concentration of carbon monoxide and that of nitrogen oxides on the secondary side of the oxidation catalyst to substantially zero and a value equal to or lower than a predetermined value, respectively, when the Adjustment 2 is made. In the present embodiment, the concentration ratio means a mutual relationship between the concentration of carbon monoxide, that of nitrogen oxides, and that of oxygen. A preferably predetermined reference concentration ratio K0 of the Adjustment 0 is determined by the following formula (1), and preferably set in such a manner that it satisfies the following formula (2), the first predetermined concentration ratio K1 is made smaller than the predetermined reference concentration ratio K0 and the second predetermined concentration ratio K2 is made larger than the predetermined reference concentration ratio K0.

$$([NOx]+2[O_2])/[CO]=K \quad (1)$$

$$1.0 \leq K = K0 \leq 2.0 \quad (2)$$

where [CO], [NOx], and [$O_2$] represent concentrations of carbon monoxide, nitrogen oxides, and oxygen, respectively, and satisfying the condition of [$O_2$]>0.

The predetermined reference concentration ratio K0 is a concentration ratio of oxygen, nitrogen oxides, and carbon monoxide on the primary side of the oxidation catalyst in which the concentration of oxygen, that of nitrogen oxides, and that of carbon monoxide on the secondary side of the oxidation catalyst are each decreased to substantially zero. Formula (1) is to determine the predetermined reference concentration ratio K0, and formula (2) indicates conditions for decreasing the concentration of oxygen, that of nitrogen oxides, and that of carbon monoxide on the secondary side of the oxidation catalyst to substantially zero. Theoretically, each of these concentrations can be decreased to zero under the condition of K0=1.0. However, experimental results have confirmed that each of the concentrations can be decreased to substantially zero within a scope of formula (2) and an upper limit of the K0, 2.0, may be a value greater than 2.0, depending on characteristics of the catalyst.

When a concentration ratio K on the primary side of the oxidation catalyst is adjusted so that it is lower than the predetermined reference concentration ratio K0, in other words, K in formula (1) is given as the first predetermined concentration ratio K1, which is smaller than K0 (the Adjustment 1), the concentration of oxygen and that of nitrogen oxides on the secondary side of the oxidation catalyst are decreased to substantially zero and the concentration of carbon monoxide is decreased to a value equal to or lower than a predetermined value. The predetermined value of the concentration of carbon monoxide is preferably set to be equal to or lower than an emission standard value (since this value is different depending on countries, it may be changed in each of the countries). Upon determination of the predetermined value, it is possible to determine experimentally the first predetermined concentration ratio K1. More specifically, such adjustment of the concentration ratio K that a value of the concentration ratio K is given as the first predetermined concentration ratio K1, which is smaller than K0, can be made by making smaller a ratio of the concentration of oxygen to that of carbon monoxide on the primary side of the oxidation catalyst than a ratio of the concentration of oxygen to that of carbon monoxide, which satisfies the predetermined reference concentration ratio K0.

Further, a concentration ratio K on the primary side of the oxidation catalyst is adjusted in such a manner that the concentration ratio K will be the second predetermined concentration ratio K2, which is greater than K0, (the Adjustment 2), thereby the concentration of carbon monoxide on the secondary side of the oxidation catalyst is decreased to substantially zero and that of nitrogen oxides on the secondary side of the oxidation catalyst is decreased to a value equal to or lower than a predetermined value. In this instance, the concentration of oxygen on the secondary side of the oxidation catalyst will be a predetermined concentration. A predetermined value of the concentration of nitrogen oxides is different from the predetermined value of the concentration of carbon monoxide and preferably equal to or lower than an emission standard value determined in various countries. Upon determination of the predetermined value, it is possible to determine experimentally the second concentration ratio K2. More specifically, such adjustment of the concentration ratio K to give the second predetermined concentration ratio K2 can be made by making greater the ratio of the concentration of oxygen to that of carbon monoxide on the primary side of the oxidation catalyst than a ratio of the concentration of oxygen to that of carbon monoxide, which satisfies the predetermined reference concentration ratio K0.

In Embodiment 1 of the treatment method, at first, in the combustion step, the burner generates gas free of hydrocarbons but containing nitrogen oxides and carbon monoxide. Then, a concentration ratio K of oxygen, nitrogen oxides, and carbon monoxide in the gas on the primary side of the catalyst is adjusted to the predetermined reference concentration ratio K0, the first predetermined concentration ratio K1, or the second predetermined concentration ratio K2 in the concentration ratio adjusting step, according to any one of the Adjustment 0, the Adjustment 1, and the Adjustment 2. Then, in the hazardous-substance decreasing step, the gas is in contact with the catalyst, by which carbon monoxide is oxidized by oxygen in the gas and nitrogen oxides are reduced by carbon monoxide. Where the Adjustment 0 or the Adjustment 1 is made, oxygen in the hazardous-substance decreasing step is to adjust the concentration of carbon monoxide, in other words, consuming and decreasing carbon monoxide, which is excessively available in reduction of nitrogen oxides to decrease the concentration to substantially zero. According to the hazardous-substance decreasing step, the amount of emitted nitrogen oxides in the gas is decreased to substantially zero, and the amount of emitted carbon monoxide is decreased to substantially zero or a value equal to or lower than a predetermined value.

A predetermined reference concentration ratio K0 of the Adjustment 0 and a first predetermined concentration ratio K1 of the Adjustment 1 can be collectively expressed by the following formula (3). In other words, when formula (3) is satisfied, the concentration of nitrogen oxides on the secondary side of the catalyst is decreased to substantially zero, and the concentration of carbon monoxides on the secondary side of the catalyst is decreased to substantially zero, otherwise the concentration of carbon monoxide is decreased. In order to decrease the concentration of carbon monoxide to a value equal to or lower than the predetermined value, the concentration ratio K on the primary side of the oxidation catalyst is adjusted so that the left-hand value in the formula (3) will be a value smaller than K0, thereby obtaining the first predetermined concentration ratio K1.

$$([NOx]+2[O_2])/[CO] \leq 2.0 \tag{3}$$

where [CO], [NOx], and [O$_2$] represent the concentrations of carbon monoxide, nitrogen oxides, and oxygen, respectively, and satisfying the condition of [O$_2$]>0.

An explanation will be further made for actions in the hazardous-substance decreasing step. The actions may be conducted in the following procedures. The oxidation catalyst undergoes a first reaction for oxidizing carbon monoxide and a second reaction for reducing nitrogen oxides by carbon monoxide as main reactions. Then, in reactions of the oxidation catalyst (catalyst reactions), the first reaction is predominant over the second reaction in the presence of oxygen. Thus, carbon monoxide is consumed by oxygen on the basis of the first reaction and adjusted for the concentration and nitrogen oxides are thereafter reduced by the second reaction. This is a simplified explanation. In reality, the first reaction is competitive with the second reaction. However, since the reaction of carbon monoxide with oxygen takes place apparently faster than the second reaction in the presence of oxygen, it is considered that carbon monoxide is oxidized at a first stage (first reaction) and nitrogen oxides are reduced at a second stage (second reaction).

Briefly, in the oxidation catalyst, oxygen is consumed by the first reaction of CO+½O$_2$→CO$_2$, in the presence of oxygen, and remaining CO is used to reduce nitrogen oxides by the second reaction of 2CO+2 NO→N$_2$+2CO$_2$, thereby decreasing the concentration of emitted nitrogen oxides.

Here, the value of ([NOx]+2[O$_2$])/[CO] (value of concentration ratio) is set to be 2.0 or lower as described above, and preferably 1.5 or lower. Further, [NOx] in formula (1) is a total of the concentration of nitric monoxide [NO] and that of nitric dioxide, [NO$_2$]. In the above explanation on the reaction formulae, NO is used in place of NOx to make a similar explanation, because nitrogen oxides generated at high temperatures are constituted mainly with NO, with only a few percentages taken up by NO$_2$. NO$_2$, if present, is considered to be reduced by CO in a similar manner as NO.

Where the value of ([NOx]+2[O$_2$])/[CO] (value of concentration ratio K) is 1.0, it is theoretically possible to decrease to zero the concentrations of oxygen, nitrogen oxides, and carbon monoxide emitted from the catalyst. However, carbon monoxide is experimentally found to be emitted in a slight amount. Then, a formula of ([NOx]+2[O$_2$])/[CO]=1 is the formula which has been theoretically derived from the first reaction and the second reaction, with the experimental results taken into account.

In this case, an explanation will be made for how to derive the formula of ([NOx]+2[O$_2$])/[CO]=1. Since the formula satisfies typically the predetermined reference concentration ratio K0, it is referred to as a predetermined reference concentration satisfying formula.

It is known that the first reaction (I) takes place as a main reaction inside the catalyst.

$$CO+\tfrac{1}{2}O_2 \rightarrow CO_2 \tag{I}$$

Further, inside the catalyst in which a precious metal catalyst such as Pt is used, NO reduction reaction due to CO resulting from the second reaction (II) will proceed in oxygen-absent atmospheres.

$$CO+NO \rightarrow CO_2+\tfrac{1}{2}N_2 \tag{II}$$

Therefore, with attention given to the concentration of a substance contributing to the first reaction (I) and the second reaction (II), the above reference concentration satisfying formula has been derived.

Specifically, when the concentration of CO, that of NO, and that of O$_2$ are given as [CO] ppm, [NO] ppm, and [O$_2$] ppm, respectively, the concentration of oxygen, which can be removed by CO on the basis of formula (1), is expressed by the following formula (III).

$$2[O_2]=[CO]_a \tag{III}$$

Further, in order to have a reaction expressed by formula (II), CO is needed in an amount equal to that of NO, thus establishing a relationship expressed by the following formula (IV).

$$[CO]_b=[NO] \tag{IV}$$

Where the reactions expressed by formulae (1) and (II) are allowed to occur continuously inside the catalyst, a concentration relationship expressed by the following formula (V) is needed, which can be obtained by combining formula (III) with formula (IV).

$$[CO]_a+[CO]_b=2[O_2]+[NO] \tag{V}$$

Since $[CO]_a+[CO]_b$ are the same component, they can be expressed as [CO] in terms of the concentration of CO in gas on the secondary side of the catalyst.

Thus, the predetermined reference concentration ratio satisfying formula, that is, a relationship expressed by [CO]=2 [O$_2$]+[NO] can be obtained.

Where the concentration ratio K is smaller than 1.0, the concentration of carbon monoxide is available in excess in reducing the nitrogen oxides. Therefore, the concentration of emitted oxygen is decreased to zero and carbon monoxide remains in gas after passing through the catalyst.

Further, the concentration ratio K of 2.0, which exceeds 1.0, may be due to the following reasons, although the value has been obtained experimentally. Reactions taking place in the catalyst are not completely elucidated, and there may be possibilities that auxiliary reactions may take place, in addition to the main reactions of the first and the second reactions. One of the auxiliary reactions may be that in which steam reacts with carbon monoxide to produce hydrogen, which may result in a reduction of nitrogen oxides and oxygen.

The combustion step is conducted by allowing hydrocarbon-containing fuel to burn in the burner, thereby generating gas free of hydrocarbons but containing nitrogen oxides, carbon monoxide and oxygen. This is a burning conducted in an ordinary combustion apparatus such as a boiler and not involved in an abrupt cooling such as that occurring in an internal combustion engine, by which no hydrocarbons are contained in the exhaust gas. Then, the air ratio is preferably 1.1 or lower. Thereby, combustion is conducted at a low air ratio to save energy.

The burner is a combustion apparatus in which fuel and combustible air are continuously supplied to conduct continuous combustion, thus excluding an internal combustion engine. Since an internal combustion engine such as an automobile engine is that in which fuel and combustible air are supplied discontinuously to conduct combustion, unburned combustibles such as hydrocarbons and carbon monoxide are produced in a large amount and contained in the exhaust gas. The method of treating nitrogen oxide-containing gas of the present invention is, therefore, not applicable to the internal combustion engine.

Further, the burner is preferably a primary aerated-type premixed burner at which fuel gas is previously mixed and burned. In order to effectively conduct the first reaction and the second reaction in the catalyst, it is important to adjust the concentration ratio K, which is shown in formulae (2) and (3) on oxygen, nitrogen oxides, and carbon monoxide. A premixed burner is used as the burner, thereby making it possible to relatively easily obtain the predetermined reference concentration ratio $K0$ in a low air ratio region. However, oxygen, nitrogen oxides, and carbon monoxide in gas on the primary side of the catalyst are uniformly mixed and controlled so as to obtain the individual concentrations as the predetermined concentration ratios, thus making it possible to provide a partially premixed burner or a previously-mixed burner other than a premixed burner.

The concentration ratio adjusting step is a step of adjusting a concentration ratio K on the primary side of the oxidation catalyst to be the predetermined reference concentration ratio $K0$, the first predetermined concentration ratio $K1$, or the second predetermined concentration $K2$, and can be conducted using the following first to fourth concentration adjusting device.

The first concentration ratio adjusting device adjusts the concentration ratio K by using the concentration ratio characteristics with the burner. The first concentration ratio adjusting device is conducted, preferably, by setting the air ratio of the burner. Where the concentration ratio K is adjusted by using the first concentration ratio adjusting device, the concentration ratio adjusting device other than the burner is not required, thereby making the apparatus simple in constitution. The concentration ratio characteristics of the burner are those in which the amounts of carbon monoxide and nitrogen oxides to be generated change during combustion by changing the air ratio of the burner.

The first concentration ratio adjusting device can be constituted such that carbon monoxide is injected and fuel is injected partially in the burner to increase the concentration of carbon monoxide in the gas, whereby the concentration ratio K is adjusted.

The second concentration ratio adjusting device adjusts the concentration ratio K by using the concentration ratio characteristics of the burner and by using the concentration ratio characteristics of the endothermic device for absorbing heat from the gas, which is placed between the burner and the oxidation catalyst, i.e., using the concentration ratio characteristics of the burner and the endothermic device. The concentration ratio characteristics is the characteristics in which the amounts of carbon monoxide and nitrogen oxides, which are generated by using the burner to conduct combustion by changing the air ratio, change after having passed through the whole or part of the endothermic device. Further, the concentration ratio characteristics are basically determined by the concentration ratio characteristics by the burner, and the endothermic device typically has a function of partially changing the concentration ratio characteristics of the burner or holding the concentration ratio characteristics. Where the endothermic device is the first form, the concentration of nitrogen oxides is suppressed while the concentration of carbon monoxide is increased. Where the endothermic device is the second form, typically, the concentration ratio characteristics by the burner is kept with being hardly changed.

As the endothermic device, a water-tube group constituting a storage water heater body such as a boiler can be used. The endothermic device is preferably a water-tube group constituting a storage water heater body such as a boiler. The form of the endothermic device includes a first form (corresponding to the Patent Documents 1 to 4) in which a water-tube group is placed in a combustion space with a combustion space hardly being provided in a vicinity of the burner, and a second form having a combustion space between the burner and the water-tube group. Where the endothermic device has the first form, the concentration of nitrogen oxides is suppressed while the concentration of carbon monoxide is increased. Where the endothermic device has the second form, typically, the concentration ratio characteristics by the burner are held with being hardly changed. The water-tube group refers to a plurality of water tubes for thermal exchange of gas from the burner, which can be constituted by meandering one water tube similarly as a water tube of a water heater.

The endothermic device suppresses the combustion gas temperature of the burner to suppress the concentration of generated nitrogen oxides, thereby having a function of adjusting the concentration ratio K. The endothermic device suppresses the increase in temperature of the gas to about 900° C. or more to suppress the oxidation of carbon monoxide, thereby preventing the concentration ratio of gas from the burner from being changed. In this sense, the endothermic device is constituted so as to adjust the concentration ratio K. Further, the endothermic device can have a function of absorbing heat from gas generated by the burner to use the heat, and suppressing the temperature of the gas to an activation temperature or more of the oxidation catalyst and a temperature or lower at which the thermal degradation is prevented.

Where the second concentration ratio adjusting device is used to adjust the concentration ratio K, no adjustment for concentration ratio is needed other than that by the burner or the endothermic device, thereby making an apparatus simple in constitution. Further, the endothermic device is used to suppress temperatures of the gas, thereby providing the effects of improving the durability of the oxidation catalyst.

The above third concentration ratio adjusting device adjusts the concentration ratio K by using the concentration ratio characteristics of the burner and using the auxiliary adjusting device for supplementarily adjusting the concentration ratio placed between the burner and the oxidation catalyst.

The auxiliary adjusting device is placed between the burner and the oxidation catalyst (including a part of the endothermic device) and provided with auxiliary functions to make the above adjustment by feeding carbon monoxide or adsorbing and removing oxygen, thereby increasing a concentration ratio of carbon monoxide to oxygen. The auxiliary adjusting device includes a CO generator and an auxiliary burner capable of adjusting an amount of oxygen or CO in exhaust gas.

Where the third concentration ratio adjusting device is used to adjust the concentration ratio K, the concentration ratio is adjusted by using the auxiliary adjusting device, in addition to the concentration ratio characteristics of the burner. Therefore, the burner and the endothermic device are not limited to a specially structured burner but applicable to a wider application.

The fourth concentration adjusting device adjusts the concentration ratio K by using the concentration ratio characteristics between the burner and the endothermic device for absorbing heat from the gas placed between the burner and the oxidation catalyst, and using the auxiliary adjusting device placed between the burner and the oxidation catalyst.

Where the fourth concentration ratio adjusting device is used to adjust a concentration ratio, the concentration ratio is adjusted by using the auxiliary adjusting device in addition to the concentration ratio characteristics of the burner and the endothermic device. Therefore, the application range of the burner and the endothermic device can be enlarged without being limited to a burner having a particular structure.

The catalyst is capable of reducing effectively the nitrogen oxides in a state that no hydrocarbons are contained in the gas, installed downstream from the endothermic device or on its way to the endothermic device and structured so as to hold a catalyst activating substance on a breathable matrix. The structure is not limited to a specific one. The matrix includes metals such as stainless steel and ceramics to which surface treatment is given so as to widen the area which is in contact with exhaust gas. In general, the catalyst activating substance includes platinum and may include precious metals such as Ag, Au, Rh, Ru, Pt, and Pd, a typical example of which is platinum or metal oxides depending on the practical use. Where the catalyst is installed on its way to the endothermic device, it is installed on a clearance between a plurality of endothermic devices. Such a structure is also available that the endothermic device such as water tubes is used as a matrix to hold a catalyst activating substance on the surface thereof.

Figure 2:
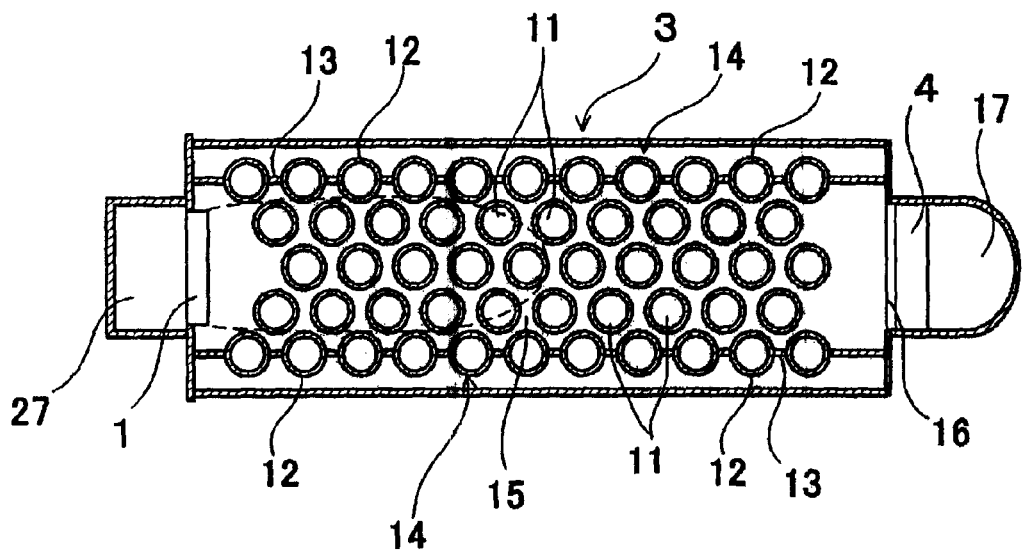
FIG. 2A sectional view taken along line II to II in FIG. 1.
Figure 3:
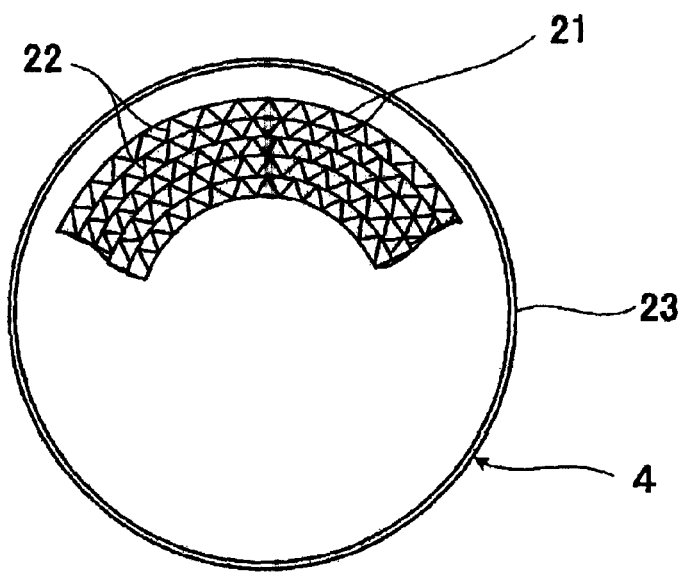
FIG. 3A view showing a constitution of major parts when an oxidation catalyst given in FIG. 2 is viewed from a direction in which exhaust gas flows.
Figure 4:
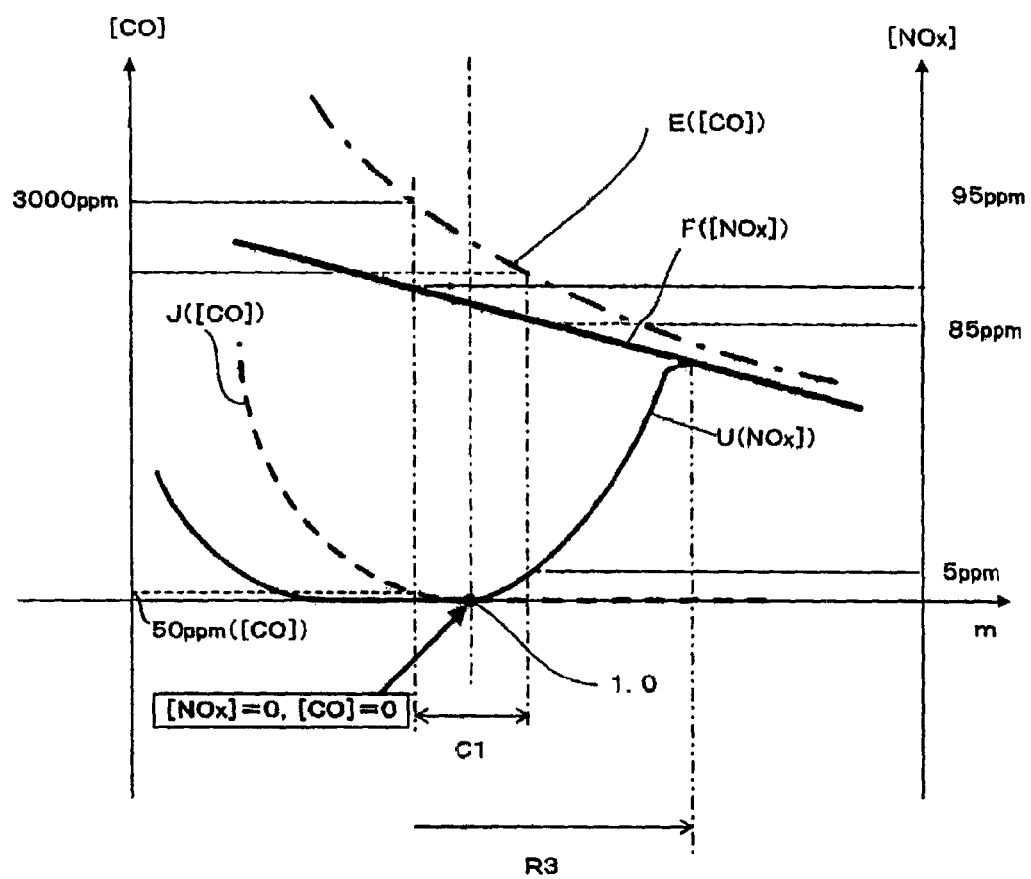
FIG. 4A drawing showing the characteristics of air ratio-NOx/CO in Embodiment 1.
Figure 5:
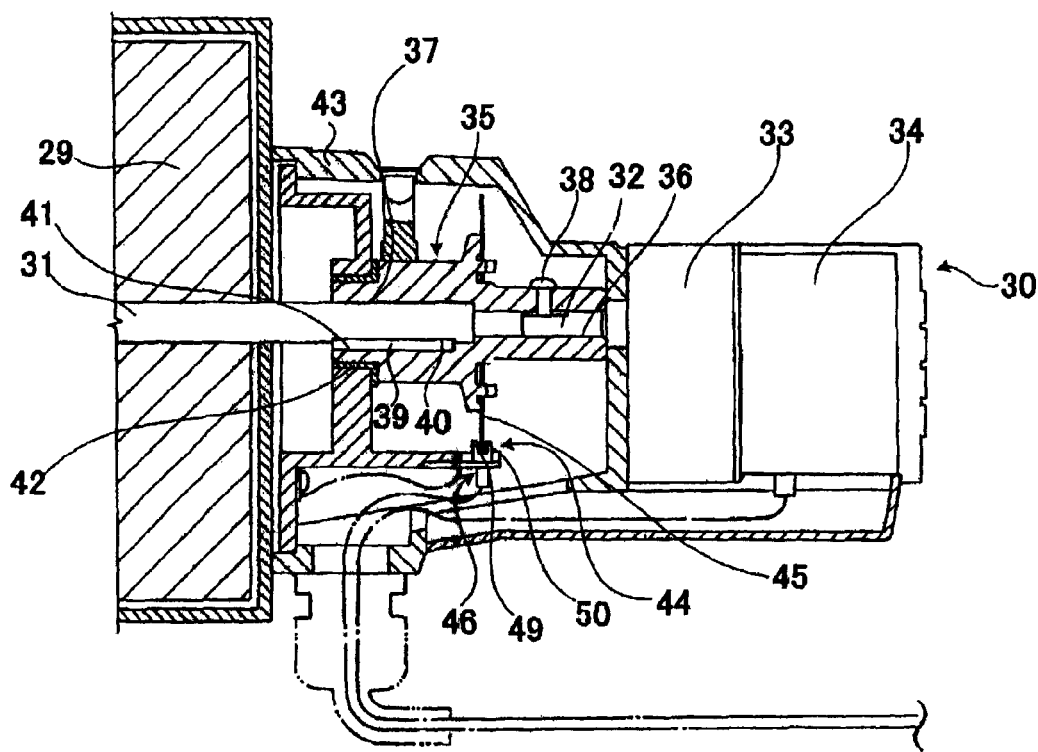
FIG. 5A partial sectional view for explaining a damper position adjusting device of Embodiment 1, which is in operation.
Figure 6:
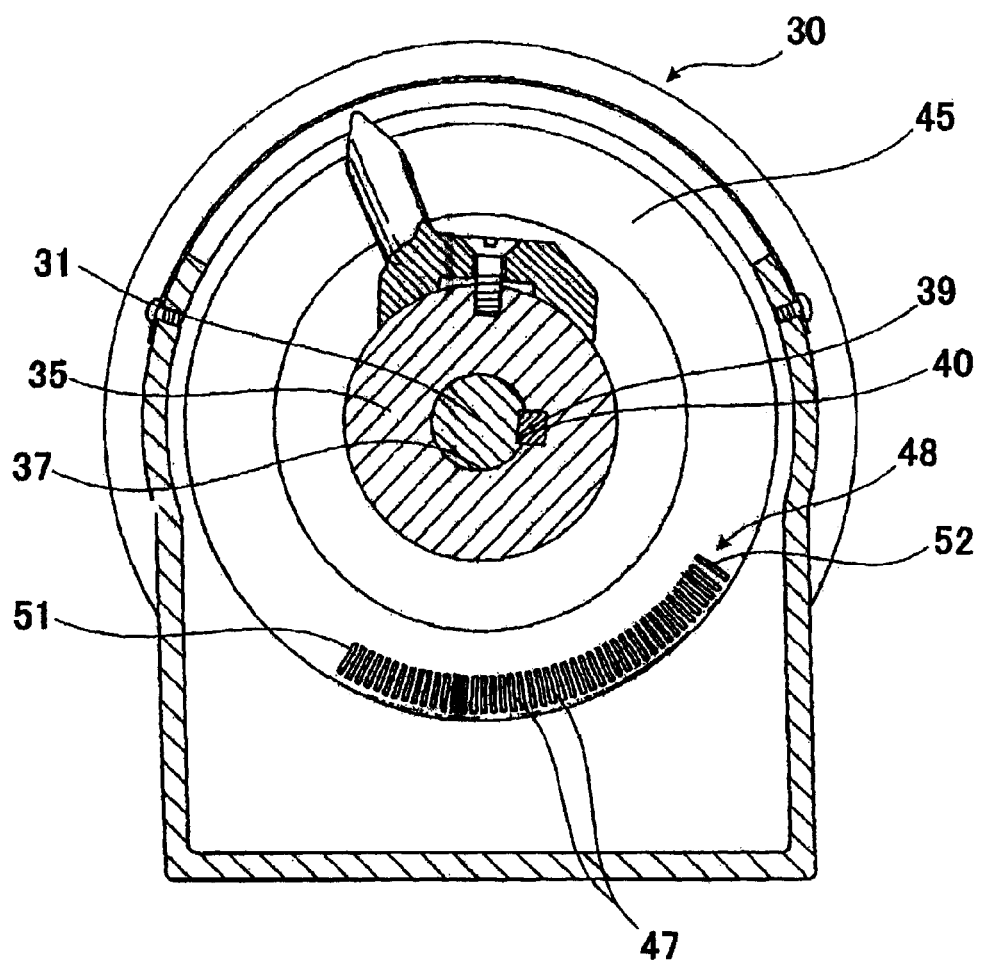
FIG. 6A sectional view for explaining major parts of the damper position adjusting device.
Figure 7:
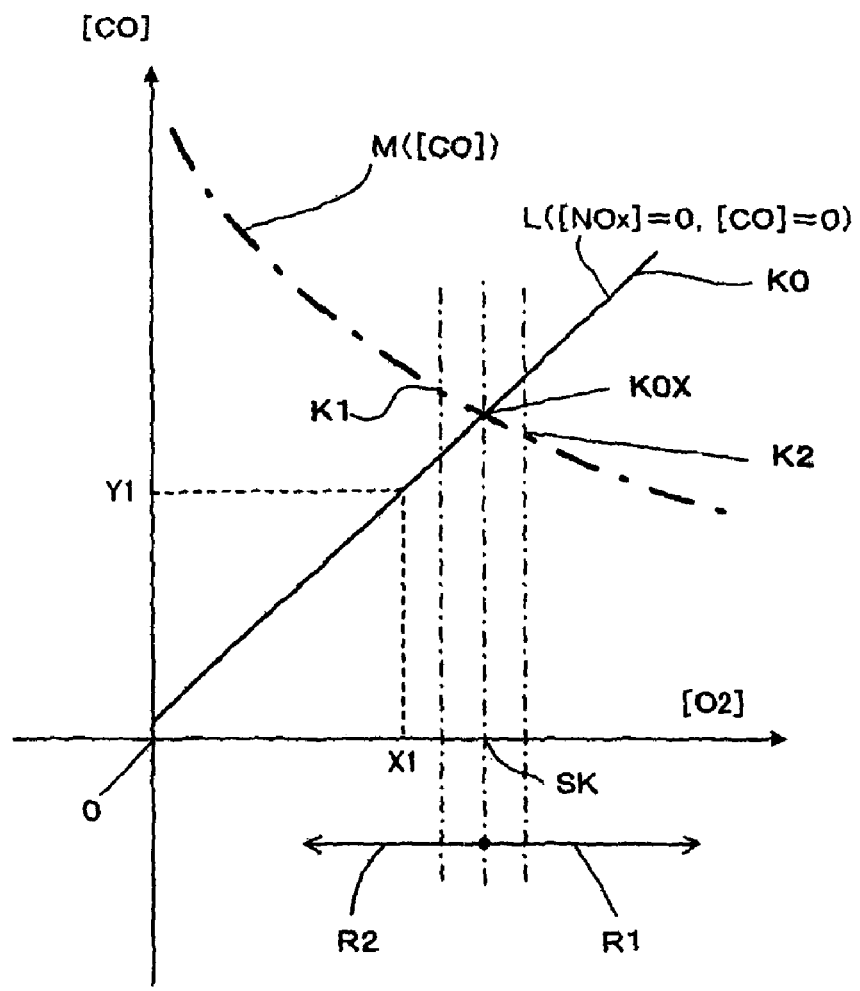
FIG. 7A pattern diagram for explaining the characteristics of a burner and endothermic device and those of a catalyst given in Embodiment 1.
Figure 8:
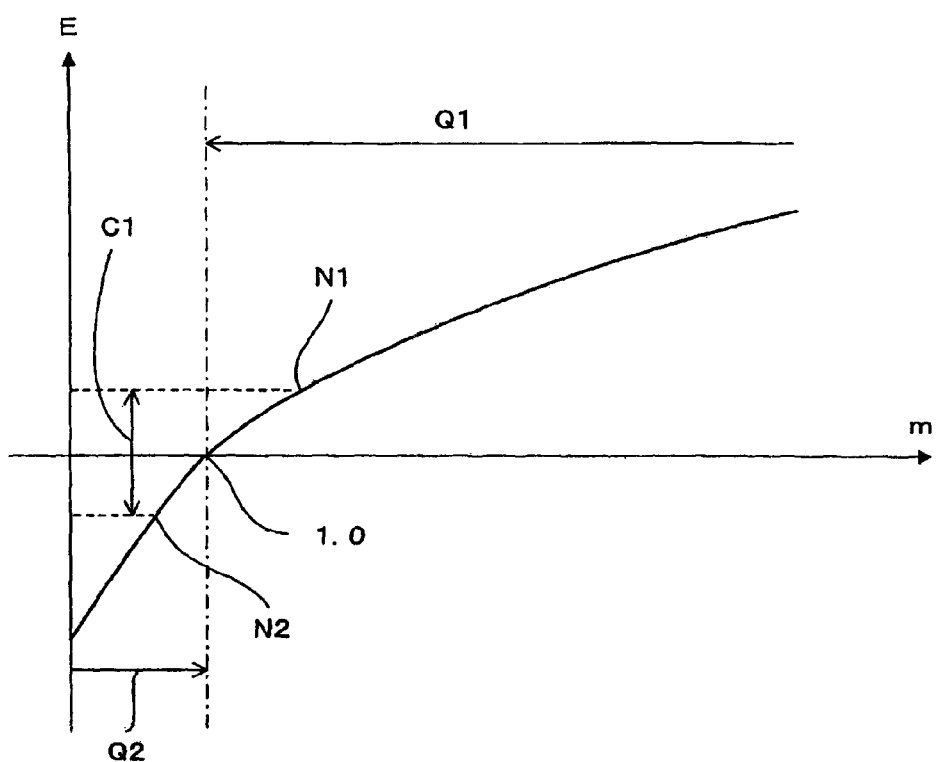
FIG. 8A drawing for explaining the output characteristics of the sensor given in Embodiment 1.
Figure 9:
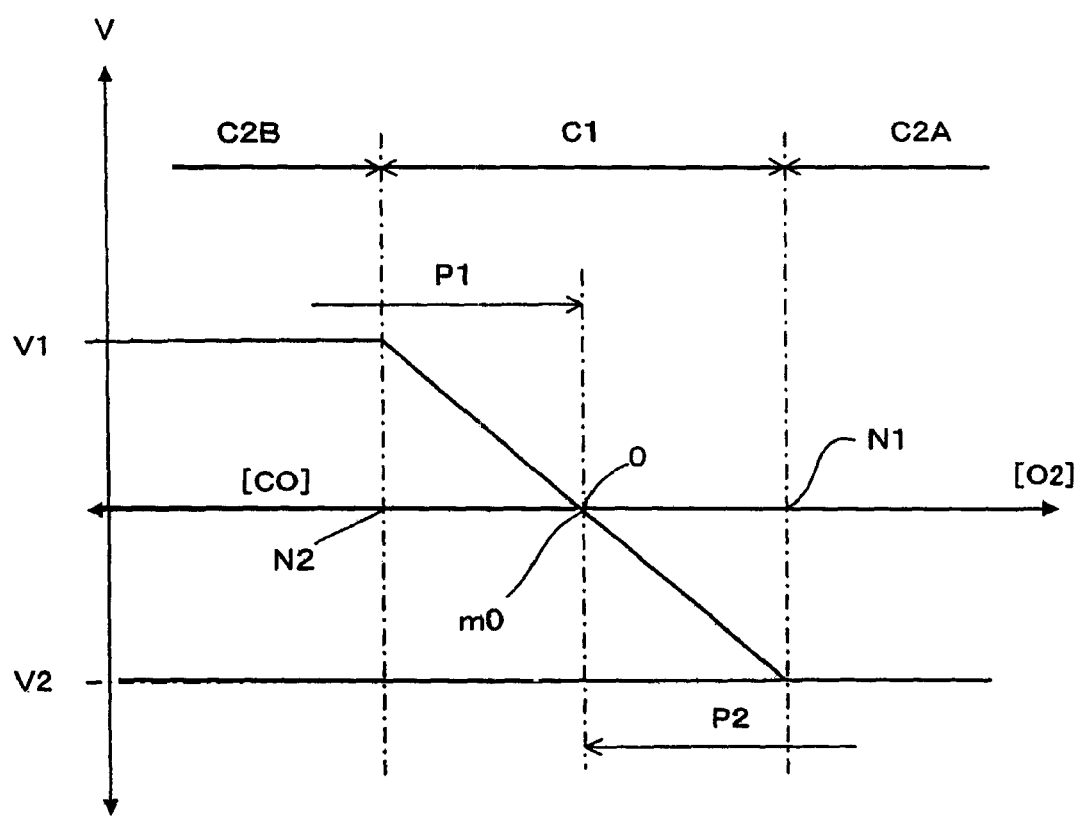
FIG. 9A drawing for explaining the motor controlling characteristics in Embodiment 1.

Next, an explanation will be made by referring to the drawings for an embodiment in which the combustion apparatus of the present invention is applied to a steam boiler: FIG. 1 is a longitudinal sectional view for explaining a steam boiler of Embodiment 1; FIG. 2 is a sectional view taken along line II to II in FIG. 1; FIG. 3 is a drawing showing a constitution of major parts when an oxidation catalyst in FIG. 2 is viewed from a direction in which exhaust gas flows; FIG. 4 is a drawing showing the characteristics of air ratio-NOx/CO in Embodiment 1; FIG. 5 is a partial sectional view for explaining a damper position adjusting device of Embodiment 1, which is in operation; FIG. 6 is a partial sectional view for explaining the damper position adjusting device in operation; FIG. 7 is a pattern diagram for explaining the characteristics of a burner and endothermic device and the characteristics of a catalyst in Embodiment 1; FIG. 8 is a drawing for explaining the output characteristics of the sensor of Embodiment 1; FIG. 9 is a drawing for explaining the motor control characteristics in Embodiment 1; and FIG. 10 is a drawing for explaining the NOx and CO decreasing characteristics of Embodiment 1.

At first, an explanation will be made for the steam boiler of Embodiment 1. The steam boiler is provided with a burner 1, a storage water heater body 3 including a group of heat transfer tubes (water tubes) 2 as endothermic device for absorbing the heat of gas generated from the burner 1, an oxidation catalyst (hereinafter sometimes simply referred to as "catalyst") 4 through which gas containing each of oxygen, nitrogen oxides, and carbon monoxide at the predetermined concentration ratios after passing through the group of heat transfer tubes 2 in contact therewith, thus oxidizing carbon monoxide and also reducing nitrogen oxides, fuel supply device 5 for supplying fuel gas to the burner 1, combustible air supply device 6 for supplying combustible air to the burner 1 to premix fuel with the combustible air, a sensor 7 for detecting the concentration of oxygen downstream from the catalyst 4, and a controller 8 as a boiler controller for inputting signals such as those from the sensor 7 or others to control the fuel supply device 5, the combustible air supply device 6, and others.

The burner 1 is a complete premix-type burner having a flat combustion face (face of ejecting premixed air). The burner 1 is similar in constitution to the burner described in Patent Document 1.

The storage water heater body 3 is provided with an upper header 9 and a lower header 10 to arrange a plurality of inner water tubes 11, 11 . . . , which constitute the water tube group 2 between the headers. Then, as shown in FIG. 2, a pair of water tube walls 14, 14 constituted by connecting outer water tubes 12, 12 . . . by using connection members 13, 13 . . . are provided on both ends of the storage water heater body 3 in a longitudinal direction, thereby forming a first gas duct 15 through which gas from the burner 1 passes substantially linearly between these water tube walls 14, 14, the upper header 9 and the lower header 10. The burner 1 is installed on one end of the first gas duct 15, and a second gas duct (smoke duct) 17 through which exhaust gas passes is connected to the other end thereof, which is an exhaust gas outlet 16. The burner 1 and the storage water heater body 3 used in Embodiment 1 are known.

The second gas duct 17 includes a horizontal part 18 and a perpendicular part 19, and the catalyst 4 is loaded at the horizontal part 18. A feed-water preheater 20, as an exhaust heat recovery system, is attached to the perpendicular part 19 so as to be positioned downstream from the catalyst 4, and the sensor 7 is placed between the catalyst 4 and the feed-water preheater 20.

The burner 1 and constituents from the burner 1 including the water tube group 2 to the catalyst 4 (in particular, the burner 1 and the water tube group 2 are major parts) are provided with functions to adjust the concentration ratio K in gas on the primary side of the catalyst 4 to the predetermined concentration ratios K0 and K1. In other words, those constituents are structured so that there are provided the characteristics of air ratio-NOx/CO as shown in FIG. 4 when adjustment is made to a set air ratio by air-ratio adjusting device 28 to be described later. The characteristics of air ratio-NOx/CO are characteristics of air ratio-NOx/CO on the primary side of the catalyst 4, which are obtained when the air-ratio adjusting device 28 is controlled to conduct combustion at a varied air ratio, (hereinafter, referred to as primary characteristics). Then, the catalyst 4 has characteristics of air ratio-NOx/CO on the secondary side of the catalyst 4, which are obtained by allowing the gas having the primary characteristics to be in contact with the catalyst 4, (hereinafter, referred to as secondary characteristics). The primary characteristics are the concentration ratio characteristics of constituents from the burner 1 to the catalyst 4, whereas the secondary characteristics are characteristics of the catalyst 4. The primary characteristics are to decrease the concentration of NOx and that of carbon monoxide on the secondary side of the catalyst 4 to substantially zero when the air ratio is adjusted to 1.0. In this instance, the predetermined reference concentration ratio K0 in gas on the primary side of the catalyst 4 is given as a specific reference concentration ratio K0X (refer to FIG. 7).

Figure 15:
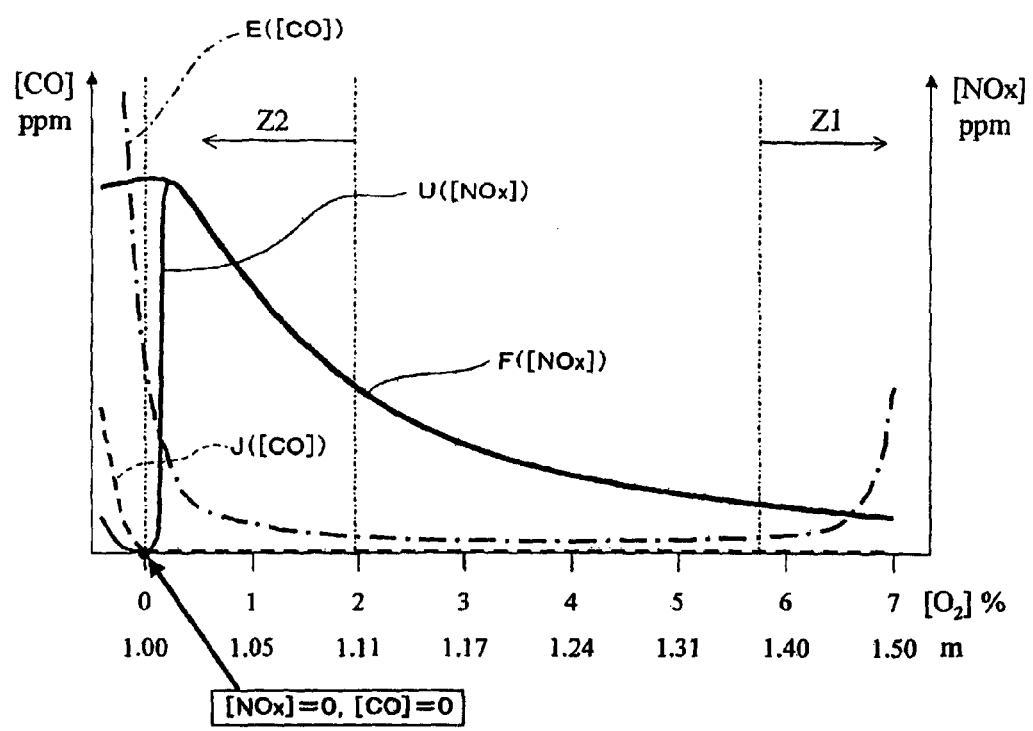
FIG. 15 A drawing for explaining the primary characteristics and secondary characteristics of NOx and CO in the present invention.

FIG. 4 is a pattern diagram in which the low air ratio region Z2 given in FIG. 15 is elongated, although the vertical axis and the lateral axis are differently scaled. In FIG. 4, a first line (characteristic line) E indicates the concentration of CO on the primary side of the catalyst 4, and a second line F indicates the concentration of NOx on the primary side. Further, a third line J indicates the concentration of CO on the secondary side of the catalyst 4, having such characteristics that the concentration of CO is decreased to substantially zero at an air ratio 1.0 or more and the concentration is abruptly increased as the air ratio is lower than 1.0. Still further, a fourth line U indicates the concentration of NOx on the secondary side of the catalyst 4, having such characteristics that the concentration of NOx is decreased to substantially zero in a predetermined region having the air ratio of 1.0 or lower, and the concentration is increased substantially from zero, when the air ratio is in excess of 1.0 and soon equal to the concentration on the primary side of the catalyst 4. A region equal to or lower than an air ratio at which the concentration of NOx on the secondary side of the catalyst 4 is equal to the concentration on the primary side is referred to as a NOx/CO decreasing region. A lower limit of the NOx/CO decreasing region is given as an air ratio at which the concentration of CO on the secondary side of the catalyst 4 is 300 ppm (CO exhaust standards in Japan). Characteristics of air ratio-NOx/CO of the low air ratio region are new characteristics, which have not yet been subjected to research.

The catalyst 4 is provided with functions of oxidizing carbon monoxide contained in the gas free of hydrocarbons after passing through the water tube group 2 (first reaction) and also reducing nitrogen oxides (second reaction). In Embodiment 1, used is a catalyst in which a catalyst activating substance is platinum. As already having been explained in the section of "Best Mode for carrying out the Invention," when theoretical consideration is given on the basis of experimental results, there may be a first reaction in which the gas satisfying formula (3) of the concentration ratio is in contact with the catalyst activating substance of the catalyst 4 to oxidize mainly carbon monoxide and a second reaction in which nitrogen oxides are reduced by carbon monoxide. Whether the first reaction proceeds or not will be determined depending on the concentration of oxygen. In the catalyst 4, it is considered that the first reaction is predominant over the second reaction.

The catalyst 4 will be specifically explained by referring to a catalyst constituted in FIG. 3 and formed in such procedures that many fine irregularities are formed on the respective surfaces of a flat plate 21 and a corrugated plate 22, both of which are made of stainless steel, as the matrix, thereby holding a catalyst activating substance (not illustrated) on the surfaces. Then, the flat plate 21 having a predetermined width is placed on the corrugated plate 22, which are then wound helically and formed into a roll shape. A side plate 23 is used to enclose and fix the thus shaped substance to form the catalyst 4. Platinum is used as the catalyst activating substance. In addition, FIG. 3 shows the flat plate 21 and the corrugated plate 22 only partially.

The catalyst 4 is active in oxidation in a low temperature region and placed at the horizontal part 18, which is on its way to the second gas duct 17, that is, at a position where exhaust gas temperature is approximately in a range of 100° C. to 350° C., and preferably 150° C. to 350° C. Then, the catalyst 4 is removably attached to the second gas duct 17 so as to be exchanged when deteriorated in performance.

The fuel supply device 5 is constituted so as to include a fuel gas supply tube 24 and a flow rate adjusting valve 25 installed on the fuel gas supply tube 24 to adjust a fuel flow rate. The flow rate adjusting valve 25 is provided with functions of controlling fuel supply at a high combustion flow rate and a low combustion flow rate.

The combustible air supply device 6 is constituted so as to include a blower 26, an air supply duct 27 for supplying combustible air from the blower 26 to the burner 1, and air-ratio adjusting device 28 for adjusting an air ratio of the burner 1 by adjusting the amount of combustible air flowing through the air supply duct 27. The fuel gas supply tube 24 is connected inside the air supply duct 27 so as to eject fuel gas.

The air-ratio adjusting device 28 is constituted so as to include a damper 29 as flow rate adjusting device for adjusting an aperture (cross-sectional area of the flow channel) of the air supply duct 27, a damper position adjusting device 30 for adjusting an aperture position of the damper 29, and the controller 8 for controlling the operation of the damper position adjusting device 30.

The damper position adjusting device 30 is, as shown in FIG. 5, provided with a driving shaft 32 removably connected to a rotating shaft 31 of the damper 29. The driving shaft 32 can be rotated by a motor 34 via a reduction gear 33. The motor 34 includes any motor freely adjustable for rotation position and stop position. In the present embodiment, a stepping motor (pulse motor) is used.

The driving shaft 32 is connected to the rotating shaft 31 of the damper 29 via a coupling 35, by which it can be rotated substantially coaxially in an integral manner. The coupling 35 is formed in a stepped cylindrical shape, the central part of which is provided with a minor diameter hole 36 and a major diameter hole 37, which have penetrated axially. The driving shaft 32 is inserted into the minor diameter hole 36, and the driving shaft 32 is integrally fixed to the coupling 35 by a fitting screw 38. The rotating shaft 31 of the damper 29 can be inserted into the major diameter hole 37, and the rotating shaft 31 can be integrally rotated via a key 39 together with the coupling 35. Therefore, key grooves 40, 41 are formed on the rotating shaft 31 and the major diameter hole 37 of the coupling 35, respectively.

The above-described coupling 35 is retained in an external case 43 of the damper position adjusting device 30 so as to rotate freely in a state that one end thereof is inserted into the driving shaft 32, with the other end inserted via a bearing 42. The external case 43 is constituted in such a manner that the reduction gear 33 and the motor 34 are retained on one end thereof and the coupling 35 and an abnormal rotation detecting device 44 are contained therein hermetically on the other end thereof in a state that the key groove 41-equipped major diameter hole 37 of the coupling 35 is exposed.

The abnormal rotation detecting device 44 is provided with a plate to be detected 45 and a detector 46. The plate to be detected 45 is extended radially outwardly and fixed to a stepped portion at the center of the coupling 35 in an axial direction. The plate to be detected 45 is installed so as to be coaxial with the coupling 35 and the driving shaft 32. A slit forming region 48 having many slits 47, 47, . . . , equally spaced in a peripheral direction is installed partially at an outer periphery of the plate to be detected 45. In the present embodiment, the slit forming region 48 is installed only in a quarter of a circular arc (90 degrees). Each of the slits 47 formed at the slit forming region 48 is identical in shape and size. In the present embodiment, narrow and long rectangular grooves along the plate to be detected 45 in the radial direction are punched peripherally at equal intervals.

The detector 46 for detecting the slit 47 is fixed to the external case 43. The detector 46 is composed of a transmission-type photo interrupter and installed in such a manner that an outer periphery of the plate to be detected 45 is placed between a light emitting device 49 and a light receiving device 50. The plate to be detected 45 is placed between the light emitting device 49 and the light receiving device 50 of the detector 46, thereby presence of absence of light reception from the light emitting device 49 by the light receiving device 50 is switched by whether or not the slit 47 on the plate to be detected 45 is arranged at a position corresponding to the detector 46 (position corresponding to a light path from the light emitting device 49 to the light receiving device 50). Thereby, it is possible to detect an aperture position of the damper 29.

The damper position adjusting device 30 is positioned so that the damper 29 keeps the air supply duct 27 fully opened in a state that a slit 51 at the clockwise end of the slit forming region 48 shown in FIG. 6 is placed at a position corresponding to the detector 46 and attached to the rotating shaft 31 of the damper 29.

Then, the slit forming region 48 is formed only at a portion corresponding to a quarter of the plate to be detected 45, therefore, in a state that the slit 51 at the clockwise end of the slit forming region 48 is placed at a position corresponding to the detector 46, the damper 29 keeps the air supply duct 27 fully closed as described above. On the other hand, in a state that a slit 52 at the counter-clockwise end of the slit forming region 48 is arranged at a position corresponding to the detector 46, the damper 29 keeps the air supply duct 27 fully opened.

The damper position adjusting device 30 is constituted so that the motor 34 and the detector 46 are connected to the controller 8, and being able to control the rotation of the motor 34, while monitoring an abnormal rotation of the damper 29. More specifically, in order to control the motor 34, the damper position adjusting device 30 is provided with a circuit for preparing control signals including driving pulse to the motor 34 and able to output the thus prepared control signal to the motor 34. Thereby, the motor 34 is arbitrarily controlled for the rotation angle, depending on normal rotation or reverse rotation and driving amount, that is, the number of driving pulses. Further, the motor 34 can change the driving pulse in interval (feeding velocity), thereby making it possible to control the rotation speed.

In controlling an actual opening and closing of the damper 29, the controller 8 at first operates to detect an original point so that a fully closed position of the damper 29 can be given as the original point. First, in FIG. 5, the plate to be detected 45 is rotated in a counter-clockwise direction. On the assumption that the detector 46 is at present arranged inside the slit forming region 48 of the plate to be detected 45, the detector 46 detects the slit 47 regularly in accordance with the rotation of the plate to be detected 45. Therefore, the detected pulse is output to the controller 8 as a detection signal. Then, the plate to be detected 45 is rotated until the detector 46 is placed outside the slit forming region 48, thereby no pulse is detected. If no pulse is detected within a predetermined time, the controller 8 recognizes that the detector 46 is outside the slit forming region 48, switching the rotating direction to a reverse direction. In other words, in the present embodiment, the original point is defined as a position at which the plate to be detected 45 is rotated reversely in a clockwise direction to detect the first pulse (slit 51 at the clockwise end). Confirmation of the original point by the clockwise rotation is made at a lower speed than the counter-clockwise rotation before the rotating direction is switched.

Since the thus detected original point corresponds to a fully closed position of the damper 29, the controller 8 outputs a driving signal to the motor 34 on the basis of this state, thus making it possible to control the opening and closing of the damper 29. If the controller 8 drives the motor 34 to open or close the damper 29, a detection signal of the slit 47 is obtained as a pulse from the detector 46 accordingly. Therefore, the controller 8 is able to monitor an abnormal rotation of the damper 29 by comparing a detection signal from the detector 46 with a control signal to the motor 34. More specifically, a control signal composed of driving pulse to the motor 34 is compared with a detection signal composed of detection pulse of the slit 47 by the detector 46, thereby monitoring the presence or absence of abnormal rotation.

For example, where no detection pulse is detected from the detector 46 despite the fact that a driving pulse has been sent to the motor 34, the controller 8 determines it to be an abnormal rotation. In this instance, the detection pulse from the detector 46 is usually different in frequency from driving pulse to the motor 34. Therefore, control is obtained, with the difference taken into account. For example, such control is obtained that the abnormal rotation is determined only in a case where no pulse of detection signal is detected at all even after the elapse of a predetermined pulse of a driving signal. The controller 8 performs a notification operation of the abnormal rotation and halts the combustion upon determination of the abnormal rotation. In contrast, the abnormal rotation can also be detected in a case where any pulse is detected by the detector 46, despite the fact that no driving pulse has been sent to the motor 34.

The controller 8 is constituted so as to control the motor 34 by referring to a previously stored air ratio control program based on signals detected by the sensor 7 in such a manner that an air ratio of the burner 1 will be a set air ratio (first control condition) and also a concentration ratio K of the gas on the primary side of the catalyst 4 satisfies the following formula (3) at this set air ratio (second control condition).

$$([NOx]+2[O_2])/[CO] \leq 2.0 \qquad (3)$$

where [CO], [NOx], and [$O_2$] represent the concentrations of carbon monoxide, nitrogen oxides, and oxygen, respectively, and satisfying the condition of [$O_2$]>0.

In Embodiment 1, it is the first control condition that gives a direct control. Therefore, the embodiment is constituted so that the first control condition is satisfied, by which the second control condition is automatically satisfied. This will be explained hereinafter by referring to FIG. 4 and FIG. 7.

The characteristics of air ratio-NOx/CO given in FIG. 4 are expressed based on the primary characteristics of constituents including the burner 1 and the water tube group 2 as well as the secondary characteristics of the catalyst 4. In addition, FIG. 7 expresses them based on the primary characteristics of the constituents with respect to the concentration of oxygen on the primary side of the catalyst 4 and the characteristics of the catalyst 4.

As shown in FIG. 7, the characteristics of the catalyst 4 are expressed by a fifth line L ([NOx] on the secondary side=0, [CO]=0 line) related to the predetermined reference concentration ratio K0 on the primary side of the catalyst 4. The fifth line L is a line in which the concentration of nitrogen oxides and that of carbon monoxide on the secondary side of the catalyst 4 are decreased to substantially zero when the concentration ratio K on the primary side of the catalyst 4 is positioned (placed) on the line, specifically, a line, which satisfies the predetermined reference concentration ratio K0. The fifth line L corresponds to a case where the predetermined concentration ratio of formula (3) is 1. In other words, the fifth line L is a line satisfying the following formula (3A).

$$[NOx]+2[O_2]=[CO] \qquad (3A)$$

In this instance, as shown in FIG. 10, [NOx] is approximately from 1/30 to 1/50 of [CO] in concentration. Thus, in FIG. 7, NOx concentration characteristics with respect to the concentration of oxygen are omitted, and [NOx] of formula (3A) can be negligible. Where the concentration of oxygen on the primary side is X1 on the fifth line L, the concentration of carbon monoxide on the primary side Y1 will be Y1=2X1+

[NOx]. In addition, since confirmation has been made for the predetermined reference concentration ratio K0, which decreases the concentration of nitrogen oxides and that of carbon monoxide on the secondary side of the catalyst 4 to substantially zero in a range of the concentration ratio K exceeding 1.0 up to 2.0, the fifth line L is not limited to the line L shown in the drawing but may include any line satisfying formula (2).

Then, a predetermined reference concentration ratio K0 of oxygen, nitrogen oxides, and carbon monoxide at a point at which a sixth line M indicating the primary characteristic curve of the burner 1 and the water tube group 2 intersects with the fifth line L is referred to as the specific predetermined reference concentration ratio (hereinafter referred to as specific reference concentration ratio) K0X. Where the concentration ratio K on the primary side is given as the specific reference concentration ratio K0X, the catalyst 4 has such characteristics that the concentration of nitrogen oxides and that of carbon monoxide on the secondary side of the catalyst 4 are decreased to substantially zero. The adjustment to the reference concentration ratio K0X corresponds to the Adjustment 0 of the present invention.

Then, the catalyst 4 has such characteristics that when the concentration of oxygen on the primary side is made higher than the reference oxygen concentration SK corresponding to the specific reference concentration ratio K0X, oxygen is detected on the secondary side of the catalyst 4 in a concentration depending on a difference between the concentration of oxygen on the primary side and the reference oxygen concentration, the concentration of carbon monoxide on the secondary side of the catalyst 4 is decreased to substantially zero, and the concentration of nitrogen oxides on the secondary side of the catalyst 4 is decreased to a greater extent than the concentration of nitrogen oxides on the primary side by reduction reaction. A region characterized in that oxygen is detected on the secondary side of the catalyst 4 and the concentration thereof is decreased to a greater extent than the concentration of nitrogen oxides on the primary side is referred to as a secondary NOx leakage region R1. The secondary NOx leakage region R1 is a region, which realizes the Adjustment 2 of the present invention, and an air ratio of the burner 1 is in excess of 1.0.

The catalyst 4 also has such characteristics that: when the concentration of oxygen on the primary side is lower than the reference oxygen concentration SK, carbon monoxide is detected on the secondary side of the catalyst 4 in a concentration depending on a difference between the concentration of oxygen on the primary side and the reference oxygen concentrating SK; and the concentration of nitrogen oxides on the secondary side of the catalyst 4 is decreased to substantially zero in a predetermined range. A region characterized in that carbon monoxide is detected on the secondary side of the catalyst 4 and the concentration of nitrogen oxides is decreased to substantially zero is referred to as a secondary side CO leakage region R2. The secondary side CO leakage region R2 is a region, which realizes the Adjustment 1 of the present invention, and an air ratio of the burner 1 is less than 1.0. The air ratio of the burner 1 is set in a range free of hydrocarbons but containing oxygen on the primary side of the catalyst 4, where it is set to less than 1.0. A region, which combines the secondary NOx leakage region R1 with the secondary CO leakage region R2, is referred to as a NOx/CO decreasing region R3.

The above-explained characteristics of the catalyst 4 shown in FIG. 7 are in agreement with the characteristics of air ratio-NOx/CO shown in FIG. 4. As apparent from FIG. 7, when the concentration of oxygen and/or that of the carbon monoxide on the secondary side of the catalyst 4 are detected and the air-ratio adjusting device 28 is controlled in such a manner that the concentration of oxygen and/or that of carbon monoxide are decreased to zero, the concentration ratio K on the primary side of the catalyst 4 is controlled to the specific reference concentration ratio K0X, and the concentration of nitrogen oxides and that of carbon monoxide on the secondary side of the catalyst 4 can be decreased to substantially zero. Thus, the first control condition is satisfied, by which the second control condition is also to be satisfied.

Failure to satisfy the first control condition would result in the generation of unburned combustibles such as hydrocarbons. In this case, energy loss would be caused, and the catalyst 4 would be unable to attain an effective decrease in NOx.

The second control condition is necessary in decreasing the concentration of emitted nitrogen oxides to substantially zero. It has been found by experiments and theoretical consideration that in order to decrease the concentration of nitrogen oxides and that of carbon monoxide on the secondary side of the catalyst 4 to substantially zero, a concentration ratio K, which gives $([NOx]+2[O_2])/[CO]$ may be approximately 1.0 by referring to the first reaction and the second reaction. It has been, however, confirmed that the concentration of emitted nitrogen oxides can be decreased to substantially zero even at the concentration ratio K of 1 or higher, that is, from 1.0 to 2.0.

Used as the sensor 7 is a zirconia type air-fuel ratio sensor which has a resolution of emitted oxygen concentration of 50 ppm and which is excellent in responsiveness, that is, having a response time of 2 sec or less. As shown in FIG. 8, output characteristics of the sensor 7 are those in which an output E is given as an output related to the concentration of oxygen on the positive side and as an output related to the concentration of carbon monoxide or others on the negative side. In other words, an air ratio m is calculated by referring to the concentration of oxygen to be determined (oxygen excess region) and the concentration of carbon monoxide (fuel excess region) or the like, thus obtaining an output of electric current or voltage corresponding to the air ratio m. In FIG. 8, Q1 indicates an oxygen concentration detecting zone, and Q2 indicates a carbon monoxide concentration detecting zone.

Then, the air ratio control program gives control on the basis of signals output by the sensor 7 in such a manner that an air ratio m of the burner will be the reference set air ratio m0. More specifically, is constituted as follows. That is, as shown in FIG. 9, the program includes such control procedures that a first control zone C1 at which a feeding velocity V of the motor 34 (driving amount per unit time) is changed depending on a difference between an output value E from the sensor 7 and a set value corresponding to the set air ratio m0, and second control zones C2A, C2B at which the feeding velocity V is divided into a first set value V1 and a second set value V2 outside the first control zone C1 are provided to control a driving amount of the motor 34. In FIG. 9, P1 indicates a damper opened region, and P2 indicates a damper closed region.

The first control zone C1 is set by the concentration of oxygen N1 (for example, 100 ppm) and the concentration of carbon monoxide or others N2 (for example, 50 ppm), and controlled so that an air ratio will be a set air value m0, which is substantially 1, (corresponding to the reference oxygen concentration SK).

A feeding velocity V in the first control zone C1 can be calculated by the following formula (4). The feeding velocity V is a driving amount per unit time. A rotating angle in Step 1 of the motor 34 of Embodiment 1 is 0.075 degrees, which corresponds to change in approximately 30 ppm in terms of $O_2$.

$$V = K \times \Delta X \quad (4)$$

where K represents a gain, and $\Delta X$ represents a difference between the output value of the sensor 7 and the set value.

Next, an explanation will be given for motions of the thus constituted steam boiler. First, combustible air (ambient air) supplied from the blower 26 is premixed with fuel gas supplied from the fuel gas supply tube 24 inside the air supply duct 27. The thus premixed air is ejected from the burner 1 to the first gas duct 15 inside the storage water heater body 3. The premixed air is ignited by ignition device (not illustrated) to burn. This burning is conducted at a low air ratio close to 1.0.

The gas generated in accordance with this burning is in contact with an upstream water tube group 2 and cooled. Thereafter, it is treated endothermically through heat exchange with a downstream water tube group 2 to yield gas at approximately 100° C. to 350° C. The gas free of hydrocarbons but containing oxygen, nitrogen oxides, and carbon monoxide is treated by the catalyst 4 and emitted as exhaust gas into the atmosphere from the second gas duct 17, after the concentration of nitrogen oxides and that of carbon monoxide are decreased to substantially zero.

Next, an explanation will be made for an air ratio controlled by the air-ratio adjusting device 28. The boiler used in the present embodiment is operated by switching high combustion to low combustion. Therefore, the damper 29 is positioned by selecting a high combustion airflow position or a low combustion airflow position.

The damper 29 is adjusted for position by the damper position adjusting device 30 on the basis of instructions from the controller 8. In other words, the controller 8 inputs a signal for selecting the high combustion or the low combustion and an output value corresponding to an air ratio detected by the sensor 7 to output a signal for driving the motor 34, thereby adjusting an aperture position of the damper 29. An aperture position set for the damper 29, which is used as a set value corresponding to each set air ratio m0 on high combustion or low combustion, is stored at the controller 8 as an initial value for each pulse number from an original point.

First, an explanation will be given for control on high combustion. The controller 8 determines whether the present aperture position of the damper 29 is on the opening side with respect to the set aperture position (the side to be controlled in a closing direction) or on the closing side (the side to be controlled in an opening direction) and also calculates the driving pulse number of the motor 34. It also determines whether the output value belongs to the first control zone C1 or the second control zones C2A, C2B in FIG. 9.

Where the output value belongs to the second control zone C2A, the motor 34 is driven at the first set feeding velocity V2 and also at a calculated driving pulse to close the damper 29 at a high velocity. Where it belongs to the second control zone C2B, the motor 34 is driven at the second set feeding velocity V1 and also at a calculated driving pulse to open the damper 29 at a high velocity. Therefore, where the output value is relatively distant from a set value corresponding to the reference set air ratio m0, an output value corresponding to an air ratio detected at a high velocity is controlled so as to come closer to a set value corresponding to the reference set air ratio m0, thus making it possible to give air ratio control excellent in responsiveness.

Further, where the output value belongs to the first control zone C1, a feeding velocity of the motor 34 is calculated based on formula (4) after determination of a rotational direction, and the motor 34 is driven based on the thus calculated feeding velocity and the calculated driving pulse. The control at the first control zone C1 is made at a higher feeding velocity as the output value is further distant from a set value corresponding to the reference set air ratio m0. Due to the above-described control, it is possible to smoothly bring the value closer to a set value corresponding to a target reference set air ratio m0. Further, a stepping motor capable of securing the control of a rotational position is used and a feeding velocity is controlled so as to slow down as an output value corresponding to the detected air ratio comes closer to a set value corresponding to the reference set air ratio m0, thus making it possible to suppress overshooting and hunting of the air ratio in the vicinity of a set value corresponding to the reference set air ratio m0.

The air ratio is controlled as described above, by which an air ratio m0 of the burner 1 will be a low air ratio close to 1.0 and the concentration ratio of gas on the primary side of the catalyst 4 is controlled so as to change to a lesser extent, thus stably satisfying formula (2). As a result, the concentration of nitrogen oxides on the secondary side of the catalyst 4 can be decreased to substantially zero and that of carbon monoxide on the secondary side of the catalyst 4 can also be decreased to substantially zero. Where a set air ratio m0 is made less than 1.0, the concentration of nitrogen oxides on the secondary side is decreased to substantially zero and that of carbon monoxide on the secondary side is also decreased to a value equal to or lower than a predetermined value in a range of practical values.

(Experiment 1)

An explanation will be given for the result of an experiment conducted under the following conditions, that is, a storage water heater body 3 having a capacity of evaporation per unit time of 800 kg (storage water heater body with the production type of SQ-800 manufactured by the applicant) was assembled into a premixed burner 1 to conduct combustion at 45.2 m³N/h, and a catalyst with a volume of 10 L and an inner diameter of 360 mm was prepared in which Pt was held therein as a catalyst activating substance at 2.0 g/L. Where the reference set air ratio m0 was given as 1, the concentration of carbon monoxide, that of nitrogen oxides, and that of oxygen on the primary side of the catalyst 4 (before passage of the catalyst 4) were adjusted to 2,295 ppm, 94 ppm, and 1,655 ppm, respectively, in terms of an average value for 10 minutes, and those on the secondary side of the catalyst 4 (after passage of the catalyst 1) were adjusted to less than 13 ppm, 0.3 ppm, and 100 ppm, respectively, in terms of an average value for 10 minutes. In this instance, the concentration of oxygen on the secondary side of the catalyst 4, 100 ppm, was a detection limit of oxygen concentration. Further, temperatures of gas before and after the catalyst 4 were approximately 302° C. and 327° C., respectively. In the present Experiment 1 as well as the following Experiments 2 and 3, the catalyst 4 was placed slightly upstream from the feed-water preheater 20, and measurement instruments were placed before and after the catalyst 4. The respective concentrations and temperatures of gas after passage of the catalyst 4 were measured by using an instrument (PG-250) manufactured by Horiba Ltd., and the respective concentrations before passage of the catalyst 4 were measured by using an instrument (COPA-2000), manufactured by Horiba Ltd. As a matter of course, hardly any change may be found in the measurement concentration where the catalyst 4 is arranged in the position shown in FIG. 1.

(Experiment 2)

FIG. 10 shows values at each concentration ratio K at the concentration of carbon monoxide, that of nitrogen oxides, and that of oxygen obtained in a case where the same burner 1 and the storage water heater body 3 as those of the Experiment 1 were used to conduct combustion at the same rate as that of Experiment 1, and a catalyst with a volume of 10 L and an inner diameter of 360 mm was prepared in which Pd was held therein as a catalyst activating substance at 2.0 g/L. In this instance, the concentration of oxygen after passage of the catalyst was measured by the same oxygen concentration sensor as that used in Experiment 1 and indicated as 100 ppm, even when the concentration was actually less than 100 ppm. Temperatures of gas before and after the catalyst 4 were in the ranges of approximately 323° C. to 325° C. and approximately 344° C. to 346° C., respectively.

According to the above Embodiment 1, damper position adjusting device (air-ratio adjusting device) 30 for adjusting the ratio of combustible air to fuel is used to control the air ratio to 1.0, thus making it possible to adjust the concentration ratio of oxygen, nitrogen oxides, and carbon monoxide on the primary side of the catalyst 4 to the specific reference concentration ratio K0X (the Adjustment 0) and also decrease the concentration of emitted NOx and that of emitted CO to substantially zero. Therefore, as compared with technologies for decreasing NOx by addition of water/steam and those for decreasing NOx by use of a denitration agent, the present invention is able to decrease NOx and CO in a simple constitution in which air-ratio adjusting device and a catalyst are used.

Further, since the air ratio is set to substantially 1.0, an energy-saving operation can be performed. Incidentally, an ordinary boiler operated at oxygen concentration of 4% (air ratio of approximately 1.235) is compared with that operated at an oxygen concentration of 0% (air ratio of approximately 1.0) to find that the boiler of is increased approximately by 1 to 2%. Nowadays, when measures are required for combating global warming, an increase in boiler efficiency can make a great contribution to industries.

Still further, the sensor 7 is installed on the secondary side of the catalyst 4 to control an air ratio, thus making it possible to obtain a stable control, as compared with a case where the sensor is installed on the primary side of the catalyst 4 to control the air ratio. The air ratio is also controlled at a resolution of oxygen concentration of 100 ppm or lower, thus making it possible to obtain air ratio control responsively and stably in a region great in the amount of CO and high in the CO increasing rate in air ratio-CO characteristics.

Embodiment 2

Figure 11:
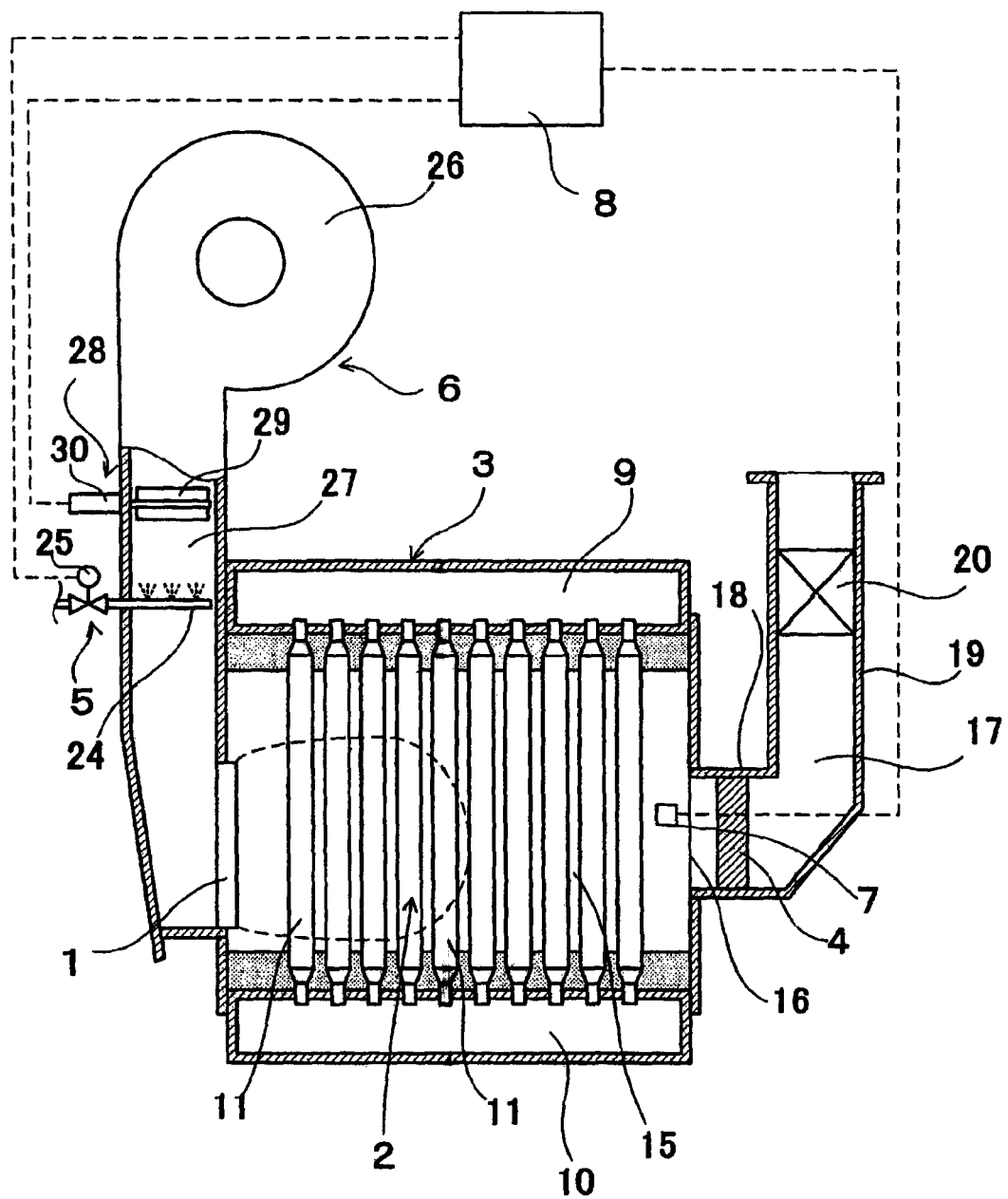
FIG. 11A longitudinal sectional view for explaining a steam boiler of Embodiment 2.
Figure 12:
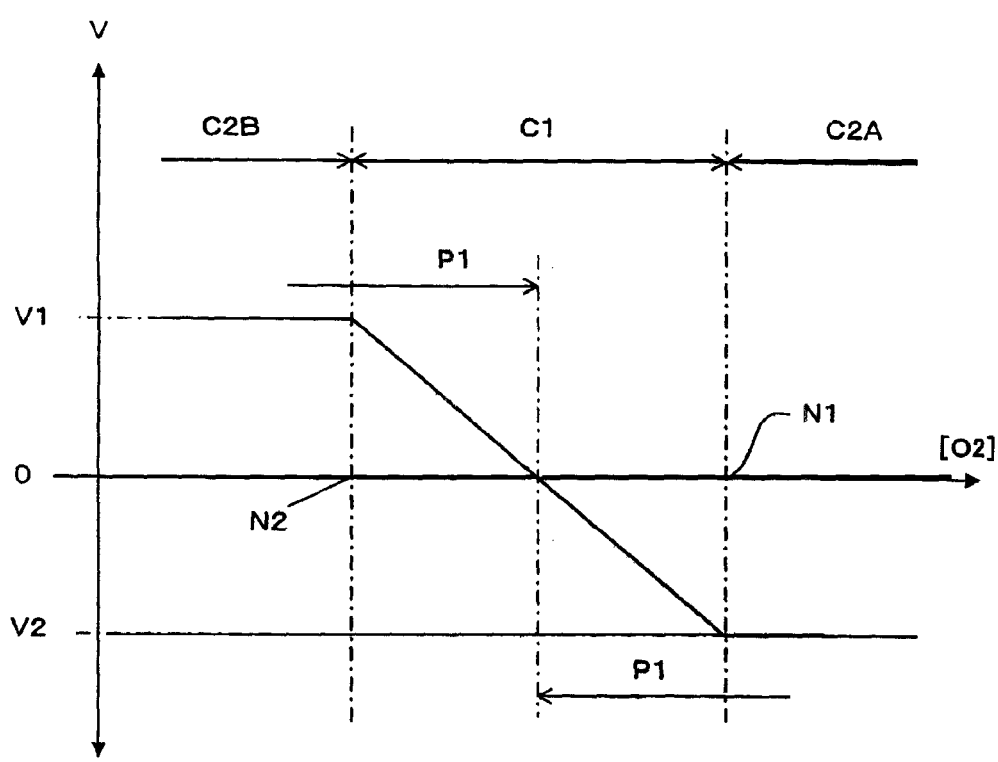
FIG. 12A drawing for explaining the motor controlling characteristics in Embodiment 2.

Another Embodiment 2 of the present invention will be explained by referring to FIG. 11 and FIG. 12. In Embodiment 2, a sensor 7 for detecting the concentration of oxygen is installed not on the secondary side of the catalyst 4 but on the primary side. The sensor 7 is used exclusively as a sensor for detecting the concentration of oxygen. Then, FIG. 12 shows control characteristics of the motor 34 on the basis of the sensor 7. Hereinafter, an explanation will be made only for parts different from those of Embodiment 1, with an explanation omitted for common parts.

In Embodiment 2, an air ratio is controlled indirectly by detecting the concentration of oxygen on the primary side of the catalyst 4 by using the sensor 7 in such a manner that a reference set air ratio m0 is set to 1.0 (the concentration of oxygen on the secondary side of the catalyst 4 is decreased to zero). It is now known on the basis of various experiment results that where the concentration of oxygen $O_2$ on the primary side of the catalyst 4 is controlled to a value of $0\% < O_2 \leq 1.00\%$, the above formula (2) is satisfied and the concentration of oxygen on the secondary side of the catalyst 4 is decreased to substantially zero. In other words, it is known that the air ratio can be set to substantially 1.

As shown in FIG. 12, the air ratio control program of Embodiment 2 includes control procedures in which a first control zone C1 for changing based on a value E detected by the sensor 7 (oxygen concentration signal) a feeding velocity V of the motor 34 (driving amount per unit time) depending on a difference between the thus detected value and the set oxygen concentration value and second control zones C2A, C2B for dividing the feeding velocity V into a first set value and a second set value, respectively, outside the first control zone C1 being provided to control a driving amount of the motor 34.

A range in which the first control zone C1 is set will be controlled so as to fall within a range set by oxygen concentration N1 and oxygen concentration N2. A feeding velocity V at the first control zone C1 will be calculated by referring to formula (4) similar to Embodiment 1.

Embodiment 3

Figure 13:
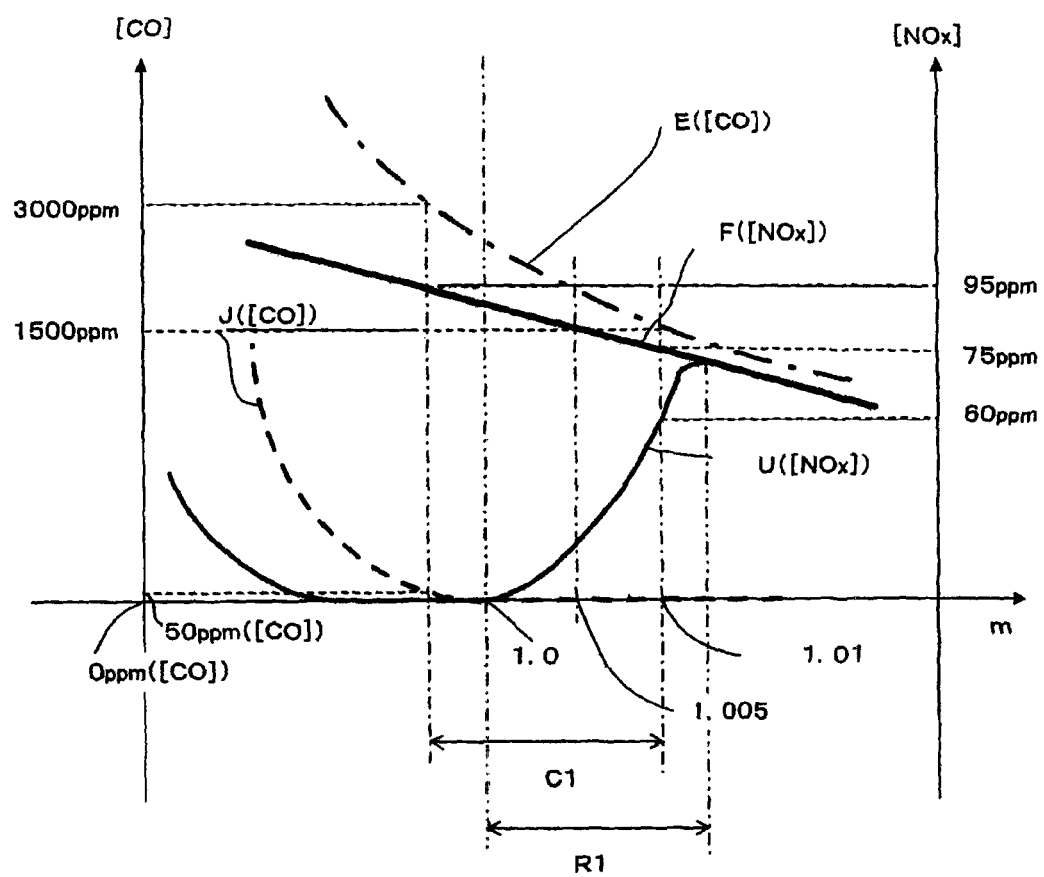
FIG. 13 A drawing for explaining an air ratio control by using the characteristics of air ratio-NOx/CO in Embodiment 3.

As shown in FIG. 13, Embodiment 3 is an example in which the set air ratio is set to such a value that the concentration of NOx of the secondary characteristics is substantially in excess of zero and lower than the concentration of NOx of the primary characteristics. This value is an air ratio of secondary NOx leakage region R1 of the secondary characteristics at which the set air ratio is substantially in excess of 1.0. Adjustment of concentration ratio K in Embodiment 3 is the Adjustment 2.

The first control zone C1 in Embodiment 3 is that in which a center of the control range (target air ratio) is an air ratio of 1.005 ($O_2$ concentration: approximately 1,000 ppm), the left end is a value in a region substantially lower than an air ratio of 1.0, and the right end is an air ratio 1.01 ($O_2$ concentration: approximately 2,000 ppm). When an explanation is given by referring to FIG. 7, the air ratio is to be controlled in the secondary NOx leakage region (region at which the Adjustment 2 is realized) where the concentration of oxygen on the primary side of the catalyst 4 is higher than the reference oxygen concentration.

(Experiment 3)

In Embodiment 3, where experiments were conducted under the same conditions as those of Experiment 1 (excluding the set air ratio), the concentration of CO, that of NOx, and that of $O_2$ on the primary side of the catalyst 4 (before passage of the catalyst 4) were adjusted to 1,878 ppm, 78 ppm, and 3,192 ppm, respectively, in terms of an average value for 10 minutes, and those on the secondary side of the catalyst 4 (after passage of the catalyst 4) were adjusted to 0 ppm, 42 ppm, and 1,413 ppm, respectively, in terms of an average value for 10 minutes.

As apparent from Experiment 3, air ratio control in Embodiment 3 is able to decrease the concentration of emitted NOx to a value lower than the concentration of NOx of the primary characteristics due to reduction of the catalyst 4 and also decrease the concentration of emitted CO to zero.

In Embodiment 3, the first control zone can be freely set in a range of the secondary NOx leakage region R1. NOx can be decreased to a greater extent and energy is saved more effectively, as the first control zone C1 is brought closer to an air ratio of 1.0. However, since the concentration of CO to be treated is high (in the case of a steep concentration gradient), there is an easy leakage of CO, which makes the control more difficult to require a greater amount of catalyst. Therefore, the first control zone is set to the right side so as to be distant away from an air ratio of 1, thus making it possible to obtain an easy control and decrease the amount of the catalyst 4.

More specifically, the left end of the first control zone C1 is not set to an air ratio of 1.0 or lower in Embodiment 3 (FIG. 13), but can be set to an air ratio of 1.0. Further, the left end of the first control zone C1 can be set to a value exceeding the air ratio of 1.0.

Embodiment 4

Figure 14:
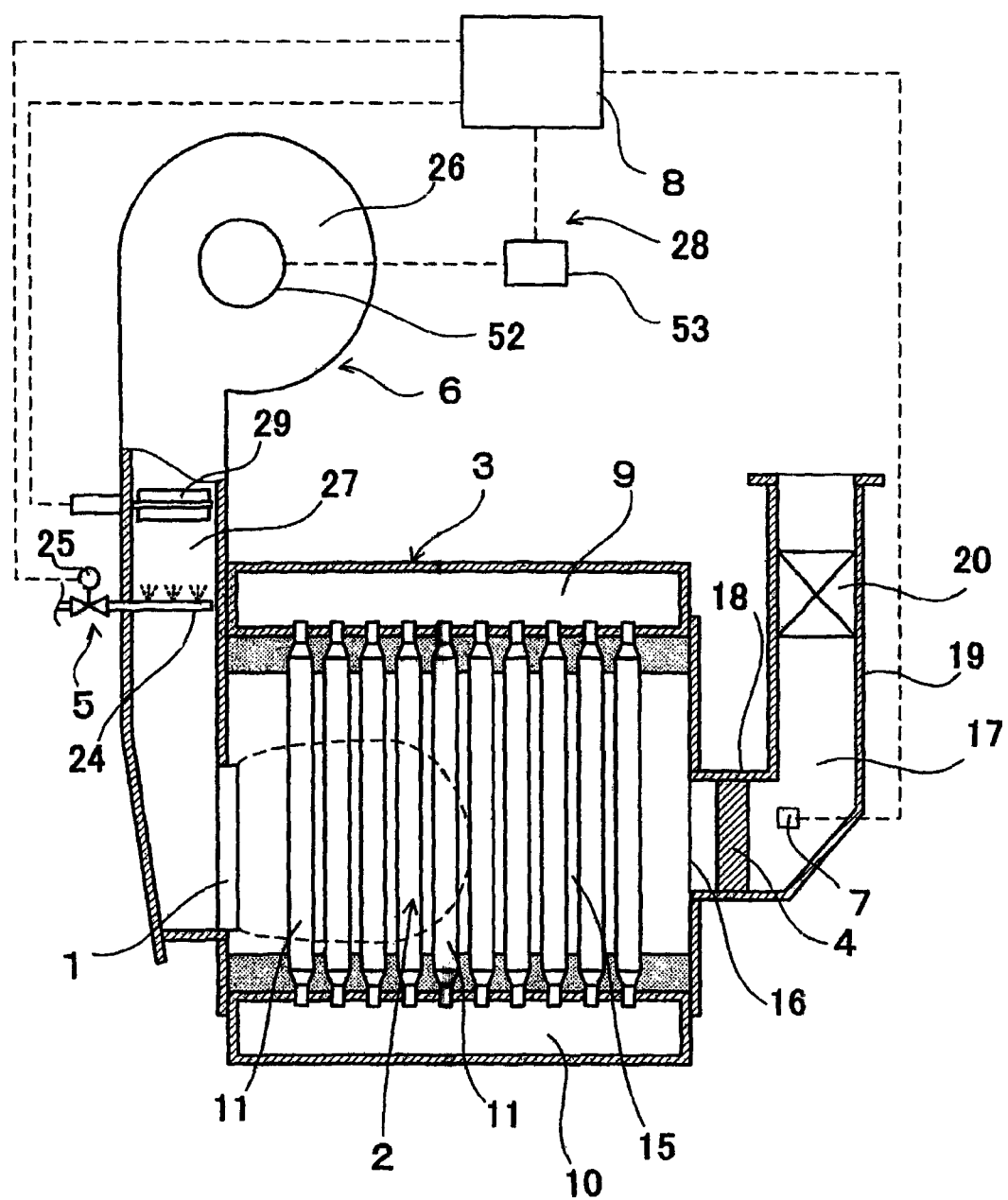
FIG. 14 A longitudinal sectional view for explaining a steam boiler of Embodiment 4.

In Embodiment 4, by referring to FIG. 14, the air ratio controller 28 includes a blower motor 52 for driving the blower 26 and an inverter 53 for controlling a revolution speed of the motor 52. Embodiment 4 is constituted in such a manner that air ratio control and concentration ratio constant control are obtained not by using the damper 29 but by using the inverter 53. The control of the blower motor 52 by the controller 8 can be obtained by suppressing the overshooting and hunting given in FIG. 9 covering Embodiment 1. The damper 29 controls air flow on high combustion and on low combustion by lowering the aperture on ignition and increasing the aperture during stable combustion after ignition. This air flow control can be obtained by using the inverter 53. The present invention shall not be limited thereto but may be constituted so that the air flow control on ignition is obtained either by the damper 29 or the inverter 53. In Embodiment 4, other constitutions are similar to those of Embodiment 1, an explanation of which will be omitted here.

The present invention shall not be limited to Embodiments 1 to 4, which have been explained. Since the characteristics of air ratio-NOx/CO shown in FIG. 4 and FIG. 13, for example, are different in curve and concentration value, depending on a structure of the burner 1 or the storage water heater body 3 used in the combustion apparatus, different characteristics may be used. Further, in Embodiments 1 and 2, a set air ratio is 1.0 or more. The air ratio may be a value lower than 1.0 as long as combustion characteristics are not affected or no hydrocarbons are contained.

Further, in Embodiment 2, an $O_2$ concentration sensor is used as the sensor 7 but a CO concentration sensor may be used. The damper position adjusting device 30 can be modified in structure in various ways. The motor 34 also includes a geared motor (not illustrated) other than a stepping motor. Still further, the damper position adjusting device 30 is controlled by using the single controller (controller for boiler) 8. In addition to the controller 8, another controller (not illustrated) for the damper position adjusting device 30 may be installed and connected to the controller, the sensor 7, and the controller 8, thereby controlling an air ratio.

The invention claimed is:

1. A method of treating nitrogen oxide-containing gas by bringing gas generated on combustion of fuel in a burner into contact with an oxidation catalyst, to thereby decrease nitrogen oxides contained in the gas, comprising:
   a combustion step of burning hydrocarbon-containing fuel in the burner, thereby generating gas free of hydrocarbons but containing oxygen, nitrogen oxides, and carbon monoxide;
   a hazardous-substance decreasing step of bringing the gas into contact with an oxidation catalyst, thereby oxidizing carbon monoxide contained in the gas by oxygen and reducing nitrogen oxides by carbon monoxide; and
   a concentration ratio adjusting step of adjusting a concentration ratio of oxygen, nitrogen oxides, and carbon monoxide in gas on a primary side of the oxidation catalyst to a predetermined concentration ratio in which a concentration of nitrogen oxides on a secondary side of the oxidation catalyst is decreased to substantially zero or a value equal to or lower than a predetermined value and a concentration of carbon monoxide on the a secondary side of the oxidation catalyst is also decreased to substantially zero or a value equal to or lower than a predetermined value.

2. A method of treating nitrogen oxide-containing gas by bringing gas generated on combustion of fuel in a burner into contact with an oxidation catalyst, to thereby decrease nitrogen oxides contained in the gas, comprising:
   a combustion step of burning hydrocarbon-containing fuel in the burner, thereby generating gas free of hydrocarbons but containing oxygen, nitrogen oxides, and carbon monoxide;
   a hazardous-substance decreasing step of bringing the gas into contact with an oxidation catalyst, thereby oxidizing carbon monoxide contained in the gas by oxygen and reducing nitrogen oxides by carbon monoxide; and
   a concentration ratio adjusting step of adjusting a concentration ratio K of oxygen, nitrogen oxides, and carbon monoxide in gas on a primary side of the oxidation catalyst,
   wherein the concentration ratio adjusting step is one of the following adjustment 0, adjustment 1, and adjustment 2:
   adjustment 0: the concentration ratio K is adjusted to a predetermined reference concentration ratio K0 in which a concentration of nitrogen oxides and a concentration of carbon monoxide on a secondary side of the oxidation catalyst are decreased to substantially zero;
   adjustment 1: the concentration ratio K is adjusted to a first predetermined concentration ratio K1 in which the concentration of nitrogen oxides on the secondary side of the oxidation catalyst is decreased to substantially zero and the concentration of carbon monoxide on the secondary side of the oxidation catalyst is decreased to a predetermined value or lower; and
   adjustment 2: the concentration ratio K is adjusted to a second predetermined concentration ratio K2 in which the concentration of carbon monoxide on the secondary side of the oxidation catalyst is decreased to substantially zero and the concentration of nitrogen oxides on the secondary side of the oxidation catalyst is decreased to a predetermined value or lower.

3. The method according to claim 2, wherein a formula for determining the predetermined reference concentration ratio K0 is given as the following formula (1), the predetermined reference concentration ratio K0 satisfies the following formula (2), the first predetermined concentration ratio K1 is made smaller than the predetermined reference concentration ratio K0, and the second predetermined concentration ratio K2 is made larger than the predetermined reference concentration ratio K0:

$$([NOx]+2[O_2])/[CO]=K \quad (1)$$

$$1.0 \leq K=K0 \leq 2.0 \quad (2)$$

where [CO], [NOx], and [$O_2$] represent the concentrations of carbon monoxide, nitrogen oxides, and oxygen, respectively, satisfying a condition of [$O_2$]>0.

4. A method of treating nitrogen oxide-containing gas by bringing gas generated on combustion of fuel in a burner into contact with an oxidation catalyst, to thereby decrease nitrogen oxides contained in the gas, comprising:

a combustion step of burning hydrocarbon-containing fuel in the burner, thereby generating gas free of hydrocarbons but containing oxygen, nitrogen oxides, and carbon monoxide;

a hazardous-substance decreasing step of bringing the gas into contact with an oxidation catalyst, thereby oxidizing carbon monoxide contained in the gas by oxygen and reducing nitrogen oxides by carbon monoxide; and a concentration ratio adjusting step of adjusting a concentration ratio K of oxygen, nitrogen oxides, and carbon monoxide in gas on a primary side of the oxidation catalyst to a predetermined concentration ratio, wherein the predetermined concentration ratio satisfies the following formula (3):

$$([NOx]+2[O_2])/[CO] \leq 2.0 \quad (3)$$

where [CO], [NOx], and [$O_2$] represent concentrations of CO, NOx, and $O_2$, respectively, and satisfying a condition of [$O_2$]>0.

5. The method of treating nitrogen oxide-containing gas according to any one of claims 1 to 4, wherein the concentration ratio adjusting step comprises adjusting an air ratio of the burner to 1.1 or lower, the air ratio being defined by the following formula:

$$m=21/(21-[O_2])$$

where m represents the air ratio, and [$O_2$] represents a concentration of excess oxygen as a positive value in an oxygen excess region and a concentration of insufficient oxygen as a negative value in a fuel excess region.

6. The method of treating nitrogen oxide-containing gas according to any one of claims 1 to 4, wherein the predetermined concentration ratio K is adjusted by using concentration ratio characteristics of the burner.

7. The method of treating nitrogen oxide-containing gas according to any one of claims 1 to 4, wherein the concentration ratio K is adjusted by using concentration ratio characteristics between the burner and endothermic device for absorbing heat from the gas placed between the burner and the oxidation catalyst.

8. The method of treating nitrogen oxide-containing gas according to any one of claims 1 to 4, wherein the concentration ratio K is adjusted by using concentration ratio characteristics of the burner and by using auxiliary adjusting device for supplementarily adjusting the concentration ratio placed between the burner and the oxidation catalyst.

9. The method of treating nitrogen oxide-containing gas according to any one of claims 1 to 4, wherein the concentration ratio K is adjusted by using concentration ratio characteristics between the burner and endothermic device for absorbing heat from the gas placed between the burner and the oxidation catalyst, and by using auxiliary adjusting device for supplementarily adjusting the concentration ratio K placed between the burner and the oxidation catalyst.

10. A method of decreasing hazardous substances, which comprises a method of treating nitrogen oxide-containing gas free of hydrocarbons by bringing the gas generated on combustion in a burner containing nitrogen oxide and carbon monoxide into contact with an oxidation catalyst, to thereby decrease concentrations of emitted nitrogen oxides and emitted carbon monoxide, the method of decreasing hazardous substances comprising: making the gas include oxygen; and adjusting a concentration ratio among nitrogen oxide, carbon monoxide, and oxygen on a primary side of the oxidation catalyst in the gas to a predetermined concentration ratio, to thereby decrease concentrations of the nitrogen oxides and the carbon monoxide to substantially zero or a value equal to or lower than a predetermined value.

11. The method of decreasing hazardous substances according to claim 10, wherein the concentration ratio adjusting step comprises adjusting an air ratio to 1.1 or lower, the air ratio being defined by the following formula:

$$m=21/(21-[O_2])$$

where m represents the air ratio, and [$O_2$] represents a concentration of excess oxygen as a positive value in an oxygen excess region and a concentration of insufficient oxygen as a negative value in a fuel excess region.

* * * * *